(12) United States Patent
Conrad et al.

(10) Patent No.: US 8,713,528 B1
(45) Date of Patent: Apr. 29, 2014

(54) VERIFICATION OF COMPUTER-EXECUTABLE CODE GENERATED FROM A MODEL

(75) Inventors: Mirko Conrad, Watertown, MA (US); Joel David Thornton, Mesa, AZ (US); Peter Szpak, Newton, MA (US); Xiaocang Lin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 1171 days.

(21) Appl. No.: 12/559,233

(22) Filed: Sep. 14, 2009

Related U.S. Application Data

(60) Provisional application No. 61/103,167, filed on Oct. 6, 2008, provisional application No. 61/103,161, filed on Oct. 6, 2008.

(51) Int. Cl.
*G06F 9/44* (2006.01)
*G06F 9/45* (2006.01)

(52) U.S. Cl.
USPC ............ 717/124; 717/126; 717/136; 717/146

(58) Field of Classification Search
None
See application file for complete search history.

(56) References Cited

U.S. PATENT DOCUMENTS

| 5,852,449 | A * | 12/1998 | Esslinger et al. ............. 345/473 |
| 6,289,505 | B1 | 9/2001 | Goebel |
| 7,151,438 | B1 * | 12/2006 | Hall et al. ................. 340/286.06 |
| 7,331,040 | B2 | 2/2008 | Sandham et al. |
| 7,707,547 | B2 * | 4/2010 | Colton et al. ................. 717/118 |
| 8,219,406 | B2 * | 7/2012 | Yu et al. ......................... 704/275 |
| 2002/0069192 | A1 * | 6/2002 | Aegerter ............................ 707/1 |
| 2004/0205772 | A1 * | 10/2004 | Uszok et al. ................... 719/317 |
| 2004/0237074 | A1 * | 11/2004 | Aronson et al. ............... 717/158 |
| 2004/0268331 | A1 | 12/2004 | Mitchell et al. |
| 2005/0015781 | A1 | 1/2005 | Brown et al. |
| 2005/0114841 | A1 | 5/2005 | Moskowitz et al. |
| 2006/0085180 | A1 * | 4/2006 | Menezes et al. ................... 704/2 |
| 2006/0190806 | A1 * | 8/2006 | Sasson et al. ................. 715/500 |
| 2006/0288332 | A1 * | 12/2006 | Sagar et al. .................... 717/124 |
| 2007/0220486 | A1 * | 9/2007 | Lammel et al. ................ 717/114 |
| 2008/0189328 | A1 * | 8/2008 | Sareday et al. ............. 707/104.1 |
| 2009/0144218 | A1 * | 6/2009 | Bonawitz et al. ................ 706/52 |
| 2009/0144698 | A1 * | 6/2009 | Fanning et al. ................ 717/120 |

FOREIGN PATENT DOCUMENTS

WO 02/101544 A2 12/2002

OTHER PUBLICATIONS

Adams, M.M. et al., "CLAWZ: Cost-effective Formal Verification for Control Systems," DASC 2005, The 24th Digital Avionics Systems Conference, vol. 2, 5 pages (2005).

O'Halloran, C. et al., "Verification of picture generated code," 14th IEEE International Conference on Automated Software Engineering, pp. 127-136 (1999).

(Continued)

*Primary Examiner* — Henry Tsai
*Assistant Examiner* — Christopher Bartels
(74) *Attorney, Agent, or Firm* — Harrity & Harrity, LLP

(57) ABSTRACT

A code verification tool verifies that code generated from a model represents all of the functionality of the model and does not contain any unintended functionality. The code verification tool may receive for examination a model or an intermediate representation (IR) of the model and the generated code or an intermediate representation of the generated code. The code verification tool may create further intermediate representations of the model and/or the generated code in order to compare the functionality presented in both.

20 Claims, 19 Drawing Sheets

(56) References Cited

OTHER PUBLICATIONS

Invitation to Pay Additional Fees for Application No. PCT/US2012/041329, 8 pages, dated Oct. 5, 2012.

Toeppe, Steve et al., "Practical validation of model based code generation for automotive applications," Proceedings of the 18th Digital Avionics Systems Conference, vol. 2:11.A3-1-10.A.3-14 (1999).

International Search Report and Written Opinion for Application No. PCT/US2012/041329, 15 pages, dated Feb. 8, 2013.

Horowitz, Susan et al., "Integrating Non-Interfering Versions of Programs," ACM, pp. 133-145 (1988).

Horowitz, Susan et al., "On the Adequacy of Program Dependence Graphs for Representing Programs," ACM, pp. 146-157 (1988).

\* cited by examiner

| | Input Data Types 912 | Output Data Types 914 | Rounding Method 916 | Saturation on Integer Overflow 918 | |
|---|---|---|---|---|---|
| 920a | double | 922a ceiling | 0 | 924a | |
| 920b | float | 922b simplest | 1 | 924b | } 902 |
| 920c | int32 | 922c floor | 0 | | |
| 920d | int16 | 922d zero | 0 | | |
| 920e | int8 | 922f nearest | 1 | | |
| 920f | unsigned32 | | | 1 | |
| 920g | unsigned16 | | | 1 | |
| 920h | unsigned8 | | | | |
| 920i | Boolean | | | | |

930 — control values 9 x 9 x 5 x 2 rows total

```
/* Model step function */
void IEC61508_step(uint16_T U_x1, uint16_T U_y1, int16_T U_x2,  ⎫ 702a-b
                   int16_T *Y_distance, uint8_T *Y_distance_ok)  ⎭ 704a-b
{
    /* local block i/o variables */
    int16_T rtb_Add2;
    /* Sum: '<Root>/Add1' incorporates:
     *   Inport: '/Root>/x2'
     *   Inport: '/Root>/y2'
     */                       ┌─── 708
    rtb_Add2 = (int16_T)(U_x2 - U_y2);

/* Sum: '<Root>/Add2' incorporates:
     *   Abs: '<Root>/Abs1'
     *   Inport: '<Root>/x1'
     *   Inport: '<Root>/y1'
     *   Sum: '<Root>/Add'
     */                                         ┌── 706
    rtb_Add2 = (int16_T) (((uint16_T)(U_x1 - U_y1)) + rt_ABS(rtb_Add2)); ⎬ 714
                                                            └── 712
    /* Outport: '<Root>/distance' */
    (*Y_distance) = rtb_Add2;

/* Outport: '<Root>/distance_ok' incorporates:
     *   Constant: '<S1>/Constant'
     *   RelationalOperator: '<S1>/Compare'  ── 716
     */
    (*Y_distance_ok) = (rtb_Add2 <= 40);
}
       └── 720
```

*Fig. 11B*

Abstract Syntax Tree (AST)

MODEL CODE

```
25  /* Model step function */
26  void example_step(void)
27  {
28    {
29      real_T rtb_Switch;
30
31      /* Outport: '<Root>/Out1' incorporates:
32       *  DiscreteIntegrator: '<Root>/Discrete-Time Integrator'
33       */
34      example_Y.Out1 = example_DWork.DiscreteTimeIntegrator_DSTATE;
35
36      /* Switch: '<Root>/Switch' incorporates:
37       *  Inport: '<Root>/In1'
38       *  Inport: '<Root>/In2'
39       *  Inport: '<Root>/In3'
40       */
41      if (example_U.crt1 >= 0.0) {
42        rtb_Switch = example_U.x1;
43      } else {
44        rtb_Switch = example_U.x2;
45      }
46
47      /* Update for DiscreteIntegrator: '<Root>/Discrete-Time Integrator' */
48      example_DWork.DiscreteTimeIntegrator_DSTATE =
49        example_DWork.DiscreteTimeIntegrator_DSTATE + rtb_Switch;
50    }
51  }
```

1002a ☑ — Model code derived from supported language feature(s)

1004a ⊙ — Model code derived from unsupported language feature(s)

Error Reporting

- Detectable Items
  - Improperly implemented blocks — Unreachable code
  - Un-used temporary variables — Unsupportable features

```
/* Model step function */
void IEC61508_step(uint16_T U_x1, uint16_T U_y1, int16_T U_x2,  int16_T U_y2,
                   int16_T *Y_distance, uint8_T *Y_distance_ok)
{
    /* local block i/o variables */
    int16_T rtb_Add2;

/* Sum: '<Root>/Add1' Incorporates:
     *  Inport: '/Root>/x2'
     *  Inport: '/Root>/y2'
     */
    rtb_Add2 = (int16_T) (U_x2 - U_y2);

/* Sum: '<Root>/Add2' incorporates:
     *  Abs: '<Root>/Abs1'
     *  Inport: '<Root>/x1'
     *  Inport: '<Root>/y1'
     *  Sum: '<Root>/Add'
     */
    rtb_Add2 = (int16_T) (((uint16_T) (U_x1 - U_y1)) + rt_ABS(rtb_Add2));

/* Outport: '<Root>/distance' */
    (*Y_distance) = rtb_Add2;

/* Outport: '<Root>/distance_ok' incorporates:
     *  Constant: '<S1>/Constant'
     *  RelationalOperator: '<S1>/Compare'
     */
    (*Y_distance_ok) = (rtb_Add2 <= 40);
}
```

*1100*

*1102* — Verified code

*1104* — Unverified code (e.g. Model contains an item that the verification tool does not support)

*1106* — Detected error

Fig. 15

VERIFICATION OF COMPUTER-EXECUTABLE CODE GENERATED FROM A MODEL

RELATED APPLICATIONS

This application claims the benefit of provisional patent application No. 61/103,167, filed Oct. 6, 2008, and provisional patent application No. 61/103,161, filed Oct. 6, 2008, the contents of which are incorporated herein by reference in their entirety.

BACKGROUND

Many organizations are embracing Model Based Design in their production processes of real world systems. Model Based Design is a practice of specifying, analyzing, testing, and implementing systems using a common model and/or a set of models and associated objects. System implementation may involve generating code from a model or some of its parts.

Graphical modeling environments are an example of software applications that may enable a user to create, execute, and analyze models. Graphical modeling environments may be used to model dynamic and/or event-based systems. Dynamic systems are systems whose outputs change over time.

A user may create a graphical model of a real-world system using a graphical user interface, such as a graphical model editor. Graphical models may depict temporal relationships between system inputs, states, parameters, and outputs. The behavior of the dynamic system over a specified time period may be simulated using information entered into the graphical model. The graphical model may be used to compute and trace the temporal evolution of the dynamic system's outputs ("execute the graphical model"), and/or to automatically produce either prototype software systems, deployable software systems, and/or descriptions of hardware systems that mimic the behavior of either the entire model or portions of the model (code generation). Simulink® software from The MathWorks, Inc. of Natick, Mass., is one example of a graphical modeling environment that caters to various aspects of system design, analysis, simulation, and implementation.

Model based design is not limited to dynamic models or, indeed, to graphical models. Model based design may also be accomplished with textual models or a combination of graphical and textual models. Such models may be dynamic models, event-based models, etc. Models may be created within a modeling environment, or realized as stand-alone computer-executable code.

BRIEF DESCRIPTION OF THE DRAWINGS

The accompanying drawings, which are incorporated in and constitute a part of this specification, illustrate one or more exemplary embodiments and, together with the description, explain the invention. In the drawings.

FIG. 9 is an illustration of steering tables used to determine appropriate code components for a model element verification in an embodiment;

FIGS. 11A-D illustrate an exemplary model, corresponding generated code, a corresponding ECL and a corresponding AST;

FIGS. 14A-B illustrate a second exemplary model and corresponding code, marked-up in accordance with availability of inspection by the code verifier tool;

FIG. 15 depicts exemplary marked-up code according to an embodiment.

DETAILED DESCRIPTION

Figure 1:
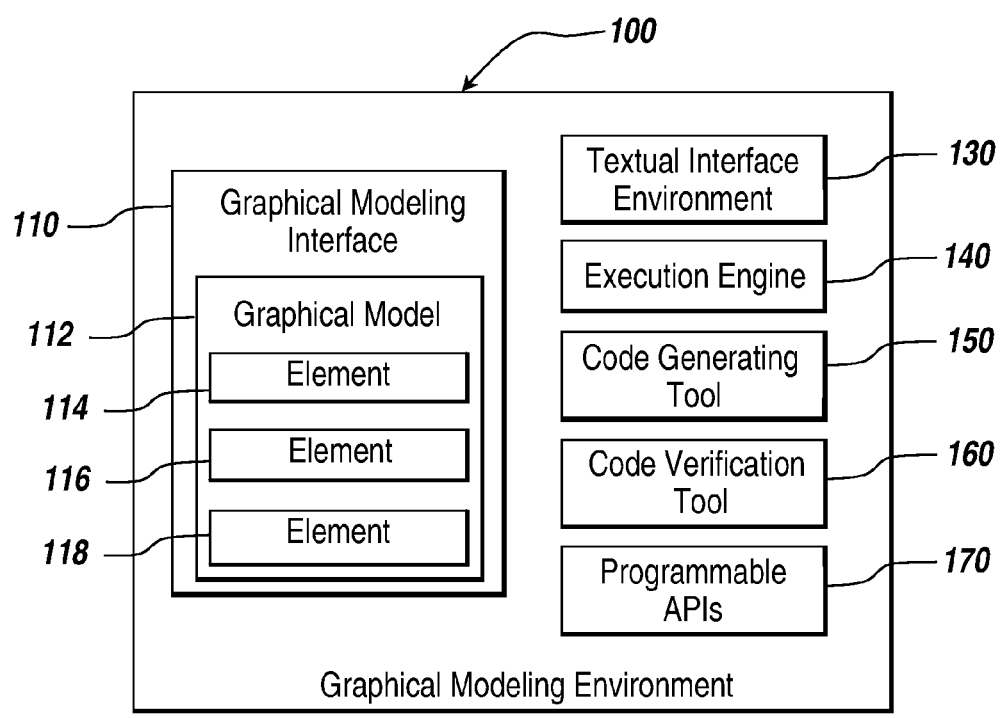
FIG. 1 depicts a high-level diagram of an exemplary graphical modeling environment that may be used for implementing various exemplary embodiments.

In designing, verifying and implementing systems using model based design, users may need to verify that code generated from a model, for example, by a code generation tool, properly represents the model and does not introduce any unintended side-effects. Such code verification may be an important process step in safety critical software systems. Code verification may be required by various government, industry or company-wide standards, and/or it may be useful for testing or implementing the designed system using the generated code.

Verifying generated code by hand may be a costly and time-consuming process. As the complexity of models used in industry grows, so does the complexity of verifying the generated code. In addition to the automation of the verification, a user may desire to do an additional manual review. Furthermore, even if manual review is performed, an automated review may be useful.

In an embodiment, a code verification tool verifies that code generated from a model represents all of the functionality of the model and does not contain any functionality not in the model. The code verification tool may receive for examination a model, which may be in an intermediate representation (IR) and the generated code, which may be in an intermediate representation. The code verification tool may create further intermediate representations of the model and/or the generated code in order to compare the functionality presented in both.

The code verification tool may create an element connectivity list (ECL) for the model. The ECL represents elements of the model and connections between them. The ECL may be created from a graphical model, a textual representation of a graphical model, and/or from a textual model. The model may also comprise graphical and textual aspects. A graphical model may be a time-based model, an event based model, etc. A time-based model may be, for example, a graphical block diagram model, and blocks may constitute elements of that model represented by entities in an ECL. An event-based model may be, for example, a state chart, and states may constitute elements represented by entities in an ECL.

The code verification tool may also receive or create an internal representation of the generated code. Such internal representation may be, for example, an abstract syntax tree (AST), generated according to the general principles known in the industry. The AST may represent statements, data, data flow, and control flow within the generated code.

In order to verify the generated code, the code verification tool may locate code components in an AST that correspond to entities in an ECL and note the correspondence or lack thereof. The code verification tool may also generate a report of verification details and verification failures, if any. A verification failure may be signified, for example, by one or more AST components that are not identified as corresponding to one or more ECL elements and/or by one or more ECL elements for which certain corresponding AST components have not been found.

In the code generation stage of the code generation tool, optimization may be desirable. Optimization may remove some elements of the model. In addition, a single statement of the generated code may represent functionality from multiple model elements. In order to provide meaningful verification of the generated code, the code verification tool may use information regarding the kind of optimizations or transformations that may take place during the code generation process.

In an embodiment, the code verification tool may support only a restricted subset of possible model elements and/or a restricted subset of connections. The restricted subset may be determined based on the model elements that generate allowable patterns in the generated code and/or based on the code verification considerations, as determined by one of skill in the art.

A model received from the user may be checked for compliance with the restricted subset of possible model elements before, during, or after generating the ECL. If there are elements in the model that are not supported by the code verification tool or that are outside a particular restricted subset within which the verification tool is operating based on user settings, the verification tool may report to the user the violations within the model. In an embodiment, verification may be aborted or not started until all violations are removed. Alternatively, verification may proceed only on the subset of the code generated from the portions of the model supported by the code verification tool, and the remaining sections of the generated code may remain unverified or left for manual verification. The generated code, the model, or any of the intermediate representations may be marked-up in accordance with the determinations made by the code verification tool.

Marking of the generated code, model, and/or IRs may be performed in many different ways. In an embodiment, color visualization may be used to differentiate sections of code corresponding to different sections of the model. For example, green color may be used to mark portions of the generated code that correspond to portions of the model that have been verified by the code verification tool and are not found to contain errors; red color may be used to mark errors located by the code verification tool; another color may be used to mark portions of the generated code for which the presence or absence of errors could not be verified; and yet another color may be used to mark portions of the generated code that correspond to portions of the model that are not supported by the verification tool. In an alternative embodiment, mark-ups may be shown through text and/or visual clues. In yet another embodiment, a user may be presented with a user interface for browsing the generated code according to what portions of the model it comes from, and/or according to mark-ups.

In an embodiment, a user may be able to review by hand the sections of the generated code that are not supported by the code verification tool. A user may then want to hand-verify the sections of the generated code that correspond to sections of the model that fall outside of that predetermined set. An embodiment may be used to assist the user in locating and verifying the sections of the code that have not been verified by the code verifier.

As used herein, the term "generated code" refers not only to the code generated from a model or a portion of a model, but also to other intermediate representations. Executable code may be, but is not limited to, computer-readable instructions in such languages as FORTRAN, ADA, Python, C, C++, Java, Java bytecodes, Assembly, MATLAB programming language, Structured Text, as well as layout and design languages, such as, for example, hardware description language (HDL), unified modeling language (UML), etc. The term "generated code" may also refer to internal and/or intermediate representations used to execute or implement a model. Models need not be solely graphical models and may be textual models, and/or a combination of graphical and textual models.

In an embodiment, the code verification tool may provide a mapping between elements of the model and portions of the generated code that have been verified to correspond to those elements. The code verification tool may also indicate sections where verification has been inconclusive or sections containing verification failures. The mapping between the model and the generated code may be bi-directional. For example, a graphical model may be mapped to generated code and vice versa. The bi-directional mapping may facilitate graphical identification of portions of the graphical model that correspond to selected segments of the generated code. The bi-directional mapping may also facilitate graphical identification of segments of generated code that correspond to selected portions of a graphical model.

A graphical model may represent a system, such as a dynamic system, and may be executable in the graphical modeling environment. A graphical model may be represented as, for example, a block diagram model, data flow model, state-diagram model, etc. Some possible examples of suitable graphical modeling environments that may be used to develop a graphical model in accordance with exemplary embodiments are, but are not limited to, Simulink® software and/or Stateflow® software from the MathWorks Inc. of Natick Mass., LabVIEW® or MATRIXx from National Instruments, Inc., Mathematica® from Wolfram Research, Inc., SCADE suite from Esterel Technologies, Inc., CoWare from CoWare, Inc., Mathcad of Mathsoft Engineering & Education Inc., Maple™ from Maplesoft, a division of Waterloo Maple Inc., Dymola from Dynasim AB of Lund, Sweden, Extend from Imagine That, Inc. of San Jose, Calif., Scilab™ and Scicos from The French National Institution for Research in Computer Science and Control (INRIA), Le Chesnay Cedex, France, MSC.Adams® from MSC.Software Corporation of Santa Ana, Calif., modeling software from dSPACE of Paderborn, Germany, electronic design automation (EDA) software from Cadence™ of San Jose, Calif. or Synopsis® of Mountain View, Calif., the BEACON software family from Applied Dynamics International of Ann Arbor, Mich., etc. In addition, modeling environments, such as those that support modeling physics-based domains, Unified Modeling Language (UML) like Rhapsody® from iLogix, Inc. of Toronto, Canada or Rational® from International Business Machines Corporation of Armonk, N.Y., or SysML like ARTiSAN Studio from ARTiSAN Software Tools, Inc of Beaverton, Oreg. or Rhapsody® from iLogix, Inc., AADL and MARTE, or Green Hills (GHS) Event Analyzer™, etc., may be suitable for implementing a graphical model in accordance with the exemplary embodiments.

Exemplary graphical models may be developed based on a set of requirements that may be contained in one or more machine-readable structures, such as a text file, a spreadsheet, a word processing file, a presentation application file, database, repository, etc., which will generally be referred to as "requirement documents for the model". The requirements may be subject to version control by a version control system to enable tracking of versions when the requirements change. In some instances, the tracing to requirements may be included in the graphical model such that the traces to the requirements for the model and the design (i.e., the graphical model) are in the same location. The requirements may be traced to the graphical model and/or generated code to facilitate identification of requirements that trace to graphical affordances in a graphical model and/or segments in generated code.

Generated code may be generated in a programming language, such as Sequential Function Chart, Structured Text or another IEC 61131 language, C, C++, SystemC, Java, Javascript, Python, FORTRAN, ADA, an assembly language, etc.; a hardware description language (HDL), such as Verilog, VHDL (very high speed integrated circuit hardware description language), etc.; a register transfer language (RTL); etc. Implementations may further generate information about a graphical model using a programming language, alone or in combination with the generated code discussed above. In one example, an XML representation (such as part of, for example, the Autosar standard) may be used to include information and meta-information about the model, such as, which functions should be called and in what order; which task should be called and at what rate; what types input arguments have; etc.

When code is generated, one or more intermediate representations (IRs) may be generated. An IR, as used herein, refers to a representation, such as a data structure that is stored in memory, a file, a database, or any other acceptable storage medium. The IR can be constructed from input data contained within a source language (e.g., a language used by a graphical model) and from which part or all of the target language information (e.g., generated code) is constructed. One example of an intermediate representation that can be used with exemplary embodiments is a control flow graph (CFG). An IR may have meta tags to identify where the content of the IR is derived from. A meta tag associates the content of the IR with content that is used to generate the IR. The content of an IR may be derived from, for example, elements in a graphical model, optimization rules, model configuration options, etc.

FIG. 1 is an exemplary high-level diagram of the graphical modeling environment 100 (hereinafter environment 100) for modeling, simulating, analyzing, etc., systems, such as dynamic systems. The environment 100 may include a graphical modeling interface 110 (hereinafter interface 110), a textual interface 130, an execution engine 140, a code generation tool 150, a code verification tool 160, and one or more programmable application program interfaces (APIs) 170. The environment 100 may be an integrated environment and may allow a user to simultaneously view a graphical model and generated code. To enable simultaneous viewing, the environment 100 may be implemented as a Multiple Document Interface (MDI) application.

The environment 100 allows a user to develop graphical models using the interface 110. The interface 110 can be a graphical user interface that may include a canvas that is represented by a graphical area on the interface 110. The canvas may allow a user to develop and/or view graphical models. For example, a user can place elements 114, 116 and/or 118 on the canvas to create the graphical model 112. The interface 110 may also provide options to allow the user to generate code and/or a report from the graphical model 112. Interface 110 may also allow a user or the environment 100 to add elements, delete elements, replace elements, etc., in the graphical model 112. For example, a user may create the graphical model 112 via the interface 110. The created graphical model 112 may represent a model of a system, such as a dynamic system and/or another type of system. The user may use predefined elements (e.g., system defined, environment defined, etc.) or user-defined elements to develop graphical model 112.

Elements 114, 116 and/or 118 may represent, but are not limited to continuous and/or discrete dynamics elements, such as integration elements, unit delay elements, etc.; algorithmic elements, such as sum, product, lookup tables, etc.; and/or structural elements, such as multiplexers, switches, signal or bus selectors, etc. Elements 114, 116, and/or 118 may also represent states, where the graphical model 112 may include a state diagram model. Elements 114, 116, and/or 118 may be used in the graphical model 112 to develop a model of a system, such as a dynamic system. Elements 114, 116, and/or 118 may be supplied by the environment 100. The environment 100 may allow a user to alter environment supplied elements 114, 116, and/or 118 or create customized elements.

In another implementation, a user may supply one or more of elements 114, 116, and 118. For example, a user may create elements 114, 116, and/or 118, thereby implementing user specified elements 114, 116, and/or 118. The user supplied elements 114, 116, and/or 118 may contain programming language statements or instructions in a technical computing language.

Elements 114, 116, and 118 may have parameters. Parameters may affect the functionality of the graphical model 112. Parameters that affect the functionality of the graphical model may be referred to as functional parameters. Some examples of functional parameters include, for example, a sample time parameter that determines when the elements 114, 116, and/or 118 execute, scaling parameters that may affect the magnitude of an output of the element 114, 116, or 118, data type that determines the format in which data is passed from one element to another, etc. Parameters may also be nonfunctional in that they do not affect the functionality or execution of the graphical model. Some examples of nonfunctional parameters include, for example, an element name, an element appearance, annotated text that is associated with the element, etc. Nonfunctional parameters may also be associated with characteristics such as power consumption, execution time, size, and weight.

Elements 114, 116, and/or 118 may be connected to each other to pass signals in the graphical model 112. Signals may be passed to and/or from elements in the graphical model 112. The signals can be represented by various types, such as integer, floating point, double, unsigned, signed bytes or words, etc. The signals may be contained in a bus format and/or may use frames. A bus format, as referred to herein, provides a format for transmitting a collection of signals to and from elements in a graphical model. A bus format may have a bus width that indicates how many signals the bus contains. When signals are in a bus format the signals may be transmitted to the same element or may be transmitted to different elements that are connected to the bus. A bus may be hierarchical. A hierarchical bus provides a format for transmitting a collection that includes one or more buses.

The textual interface environment 130 allows a user to develop a user-specified element (e.g., element 114) with code in a textual language. Code developed using the textual interface 130 may be included as, for example, the element 114 in the graphical model 112. The textual interface 130 may also facilitate debugging and profiling of graphical model 112 or the environment 100 may include a separate graphical debugger and profiler (not shown in FIG. 1).

The execution engine 140 may communicate with the interface 110. The execution engine 140 can receive the graphical model 112, which may represent, for example, a block diagram, state diagram, data flow diagram, etc., that is generated using the interface 110. The execution engine 140 may execute the graphical model 112 in an embodiment. The execution engine 140 may generate data from the execution of the graphical model 112. The data may be displayed to a user in a textual or graphical form. For example, the data may be presented to the user in table form or in graph form. The environment 100 may use a centralized data viewer to view the data generated by the execution engine 140.

The execution engine 140 may use numerical integration methods to compute behavior for differential equation as well as difference equation models. These numerical integration methods may be explicit and implicit as well as fixed step or variable step. A zero-crossing detection and location mechanism may be used by the execution engine 140 to identify and locate times at which events occur, such as a modeled collision between two rigid bodies. The execution engine 140 may handle difference equations by precomputing a static schedule of times when values change. This static schedule may employ a base rate that is the greatest common denominator of all sample times that are scheduled for execution by the execution engine 140. The execution engine 140 may handle discrete event systems based on a base rate or by using a dynamical scheduling mechanism, such as an event calendar. The execution engine 140 may employ any combination and/or permutation of these features.

The code generation tool 150 may generate code, such as source code, object code, a compiled executable, a library, etc., for forming an executable representation of the graphical model 112 provided by the interface 110. The code generation tool 150 may also be used to generate a hardware description language (HDL) or a register transfer language (RTL) representation of the graphical model 112. The generated code may be stored in multiple files. For example, part of the generated code may be stored in a header file, while another part of generated code may be stored in a source file. To generate code, the code generation tool 150 may convert a source model language representation of the graphical model 112 to a target language representation.

During the code generation process, the code generation tool 150 may generate one or more IRs prior to generating code from the graphical model 112. The IR may be a CFG that captures the semantics of the graphical model 112. An IR represented by a CFG may include nodes that represent algorithmic aspects of the graphical model 112 and edges that indicate the flow of the algorithms.

Figure 2:
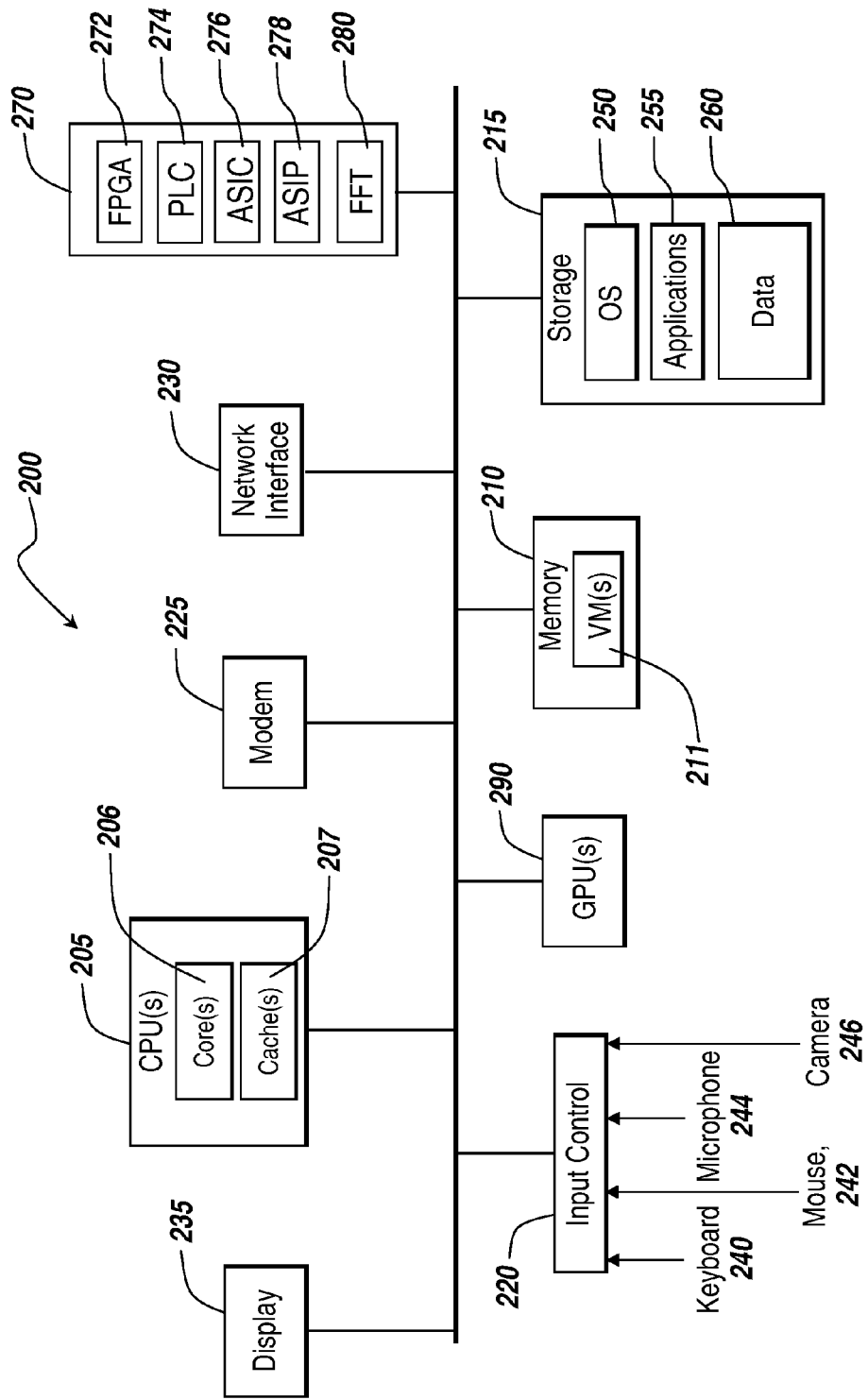
FIG. 2 depicts an exemplary computing device suitable for practicing an illustrative embodiment.

The code generation tool 150 may generate code for the execution of the graphical model 112. The code generation tool 150 may also compile generated code into object code and build an executable program, library, or any other form of executable instructions. The generated code may be designed to run on any processor, microprocessor, dual-core processor, multi-core processor, cluster of processors, digital signal processor (DSP), programmable logic device (PLD), system on chip (SOC), System in Package (SiP), reconfigurable signal conditioning hardware, operating system, computational hardware device, component of a computational hardware device, etc. Shown in FIG. 2 are some examples of target hardware on which generated code may be deployed. Such examples include FPGA 272, PLC 274, ASIC 276, ASIP 278, FFT 280, etc. In an embodiment, generated code may include embedded code targeted to run on any type of embedded system. For example, generated code may be implemented as firmware in an electronic system that uses a microprocessor or a microcontroller. Additionally, the code generation tool 150 may be configured to customize the generated code based on the target hardware platform. For example, generated code may include fixed-point code to run a fixed-point processor or generated code may emulate fixed-point behavior on a floating-point processor.

The graphical model 112 may include directives as to how code should be generated. For example, the element 114 in the graphical model 112 may be directed to have a corresponding function, method, procedure, etc., in order for it to be generated in generated code with an argument list and name as directed by the code generation tool 150. A function, method, procedure, etc., as used herein refers to a segment of code that has a defined interface for passing arguments. For clarity, the terms function, method, procedure, etc., will be referred to hereinafter simply as a function. A function performs an operation that is defined by the content in the function. The function may or may not return a value when the operation is complete. The function may be reused by other graphical model elements (e.g., elements 116, 118, etc.) with the same, or similar, functionality.

Further, optimizations such as expression folding, function inlining, function outlining, constant propagation, strength reduction, loop unrolling, etc., may be applied to generated code. Expression folding refers to reducing multiple expressions to a single expression in generated code. Function inlining refers to placing the contents of a function inline so that when a function is executed, the function does not have to go to a call site that is external to the body of generated code to perform its operation. Function outlining refers to outlining an inlined function such that when the function is executed, the function has to go to a call site that is not part of the body of generated code. Constant propagation refers to replacing variables that reference a constant with the constant. Strength reduction refers to replacing a computation with an equivalent but less expensive computation in terms of processor cost (such as speed, power usage, etc.). Loop unrolling refers to making the iterations of a loop explicit so the looping construct can be removed.

The code generated by the code generation tool 150 may be verified by a code verification tool 160. The code verification tool may verify that the code reproduces all of the functionality of the model and does not introduce any functionality that is not comprised by the model. The code verification tool 160 may generate a report. The generated report may be, for example, a document structured with sections corresponding to different elements of the model 112 and indications of whether any verification failures have been detected in those sections, a report detailing use of the temporary variables, a report detailing compliance of the code with the functionality of the model, etc.

The generated report may use navigable links. For example, the generated report may be in the form of a document in a mark up language, such as, for example, HTML.

The navigable links may contain information relating to the model 112, settings of the code generation tool 150, etc.

The programmable APIs 170 can allow a user to interface the environment 100 with an external browser and/or viewer. The programmable API 170 can allow the user to browse the generated code and/or the model 112 and to programmatically identify a code segment in generated code that corresponds to an affordance in the model 112 or to programmatically identify a affordance in the model 112 that corresponds to a segment in generated code using an external browser and/or viewer. For example, an identified affordance may include an element, a signal, an annotation, etc. The programmable API 170 can allow the external browsing or viewer to identify segments of generated code or portions of the model 112. An external code browser and/or viewer can use tracing information and the programmable API 170 to browse and/or view the model 112 and/or generated code.

The viewer may be a debugger. An unverified code fragment may automatically set a breakpoint or control other configurations of a debugger. When generating an IR, code, a report, etc., the environment 100 may use transformation rules. Transformation rules, for example, may determine how an element is represented in the IR or generated code. For example, there may be a transformation rule relating to the element 114 for transforming the element 114 into a section of the IR and there may be another transformation rule for transforming the section of the IR into generated code. The transformation rules may exist in a computer readable medium and may be contained in a file, database, repository, etc. In some embodiments a graph rewriting system may be used to implement a transformation rule. Graph rewriting systems may also be referred to as using a "graph grammar". Graph grammar may use pattern matching for replacing one graph structure with another. There are numerous ways to implement pattern matching. One common implementation is guided by heuristics to manage the computational complexity. Graph grammar may employ any number of rewriting rules (transformation rules) that can be extended by textual transformation information. Some embodiments may implement triple graph grammar or a higher order of graph grammar when generating an IR, code, a report, etc. Transformation rules, such as those implemented using triple graph grammar, may allow, for example, mapping between a first entity (e.g., an IR, generated code, a generated report, etc.), a second entity that is generated from the first entity, and the information (e.g., transformation rules) used to generate the second entity.

The programmable APIs 170 may also enable graphically identifying graphical affordances or segments of generated code that correspond to a graphical interface of a user-specified element (e.g., element 114). For example, a user may define a function in a programming language, such as MAT-LAB®, C, C++, Java, Javascript, etc., and the user may incorporate the function into the graphical model 112. The code for the user-specified element may be developed using the textual interface 130 or any other application that allows a user to develop textual code, such as a word processing application, a code browser, etc. The function can be represented by a graphical affordance that has a graphical interface. The graphical interface can represent, for example, inputs, outputs, triggers, etc., and may enable other elements in the graphical model 112 to connect to the element that represents the function.

One of ordinary skill in the art will also appreciate that the components of the environment 100 may be provided on a single computing device, as described below with reference to FIG. 2, on multiple computing devices (e.g., in a distributed configuration), and/or in other configurations (e.g., a multi-core implementation operating on one or more platforms). For example, the environment 100 may be at least partially provided as a service and/or as a virtual machine.

FIG. 2 is an exemplary computing device 200 suitable for practicing the exemplary embodiments. The implementation of FIG. 2 is illustrative and not limiting. The computing device 200 may take many forms, including but not limited to a personal computer, workstation, server, network computer, quantum computer, optical computer, bio computer, Internet appliance, mobile device, a pager, a tablet computer, a smart sensor, application specific processing device, etc.

The computing device 200 may be electronic and may include a Central Processing Unit (CPU) 205, memory 210, storage 215, an input control 220, a modem 225, a network interface 230, a display 235, processor 270, and a graphical processing unit (GPU) 290. The CPU 205 may control components of the computing device 200 to provide the interface 110, the textual interface 130, the execution engine 140, the code generation tool 150, the report generating tool 160, and/or one or more programmable APIs 170. The memory 210 may store instructions and data, and may provide the instructions and data to the CPU 205. CPU 205 may operate the computing device 200 and may run the interface 110, the textual interface 130, the execution engine 140, the code generation tool 150, the report generating tool 160, and/or one or more programmable APIs 170 based on the stored instructions.

Optionally, the computing device 200 may include multiple CPUs 205 for executing software loaded in the memory 210, and other programs for controlling system hardware. Each of the CPUs 205 can be a single or a multiple core processor 206. The code loaded in the memory 210 may run in a virtualized environment, such as in a Virtual Machine (VM) 211. Multiple VMs 211 may be resident on a single processor. Also, part of the application may run in processor 270, which may include, for example, a field programmable gate array (FPGA) 272, programmable logic controller (PLC) 274, an application specific integrated circuit (ASIC) 276, an application specific instruction set processor (ASIP) 278, a Fast Fourier Transform (FFT) processing device 280, etc. Further, part of the applications may be run on analog electronic, optical, or mechanical devices that may be included in the computing device 200. Other resources, such as, for example, GPU 290, may also be used to run part of the applications.

The storage 215 may contain software tools for applications. The storage 215 may include code 250 for the operating system (OS) of the device 200, code 255 for applications running on the operating system including the applications for the interface 110, the textual interface 130, the execution engine 140, the code generation tool 150, the report generating tool 160, and/or one or more programmable APIs 170 and data 260 generated from the interface 110, the textual interface 130, the execution engine 140, the code generation tool 150, the report generating tool 160, one or more programmable APIs 170, and/or other code. Portions of applications may be stored in the CPU cache 207, memory 210, and/or elsewhere, such as on a remote storage device connected to computing device 200 via a network, a bus, a dedicated link, etc.

The input control 220 may interface with a data entry device, such as a keyboard 240, a pointing/indexing device, such as a mouse 242, a microphone 244, a camera 246, such as a web camera, and/or other input devices such as an accelerometer, a gyroscope, a haptic device, a touchscreen, a neural interface, etc. The computing device 200 may receive, through the input control 220, input data, such as the input data for developing graphical model 112. The computing device 200 may display on the display 235 user interfaces for displaying the data generated from the interface 110, the textual interface 130, the execution engine 140, the code generation tool 150, the report generating tool 160, and/or one or more programmable APIs 170.

Figure 3:
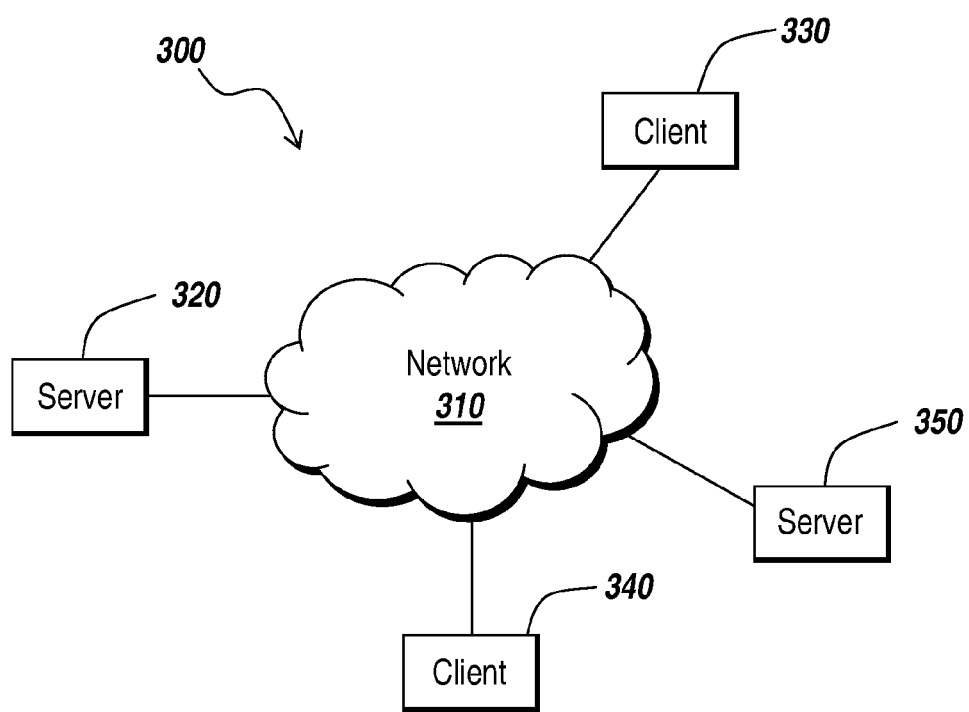
FIG. 3 depicts an exemplary distributed system suitable for a distributed implementation of exemplary embodiments.

FIG. 3 is an exemplary network environment 300 (hereinafter environment 300) suitable for processing distributed implementations of the exemplary embodiments. Environment 300 may include one or more servers 320/350 coupled to clients 330/340 via a communication network 310. In one implementation, servers 320/350 and/or clients 330/340 can be implemented via the computing device 200. The network interface 230 and the modem 225 of the computing device 200 enable the servers 320/350 to communicate with the clients 330/340 through the communication network 310.

The communication network 310 may include Internet, intranet, Local Area Network (LAN), Wide Area Network (WAN), Metropolitan Area Network (MAN), wireless network (e.g., using IEEE 802.11, IEEE 802.16, Bluetooth, etc.), etc. The communication network 310 may use middleware, such as Common Object Request Broker Architecture (CORBA) or Distributed Component Object Model (DCOM) to allow a computer (e.g., client 320) on the communication network 310 to communicate directly with another computer or device (e.g., client 330) that is connected to the communication network 310. In addition, the communication network 310 may use RMI (Remote Method Invocation) or Remote Procedure Call (RPC) technology. RMI and RPI are exemplary technologies that allow functions, methods, procedures, etc., to be called over the environment 300. For example, the client 330 may invoke a method that resides remotely on the client 340.

In environment 300, the servers 320/350 may provide the clients 330/340 with software components or products under a particular condition, such as a license agreement. The software components or products may include those for providing the interface 110, textual interface 130, the execution engine 140, the code generation tool 150, the report generating tool 160, one or more programmable APIs 170, etc. For example, the client 340 may perform the modeling of a dynamic system using a software component provided by the server 320 and send the server 320 the model for execution. The server 320 may return the execution results to the client 340 and the client 340 may subsequently display the data to the user with the information on the data.

Figure 4:
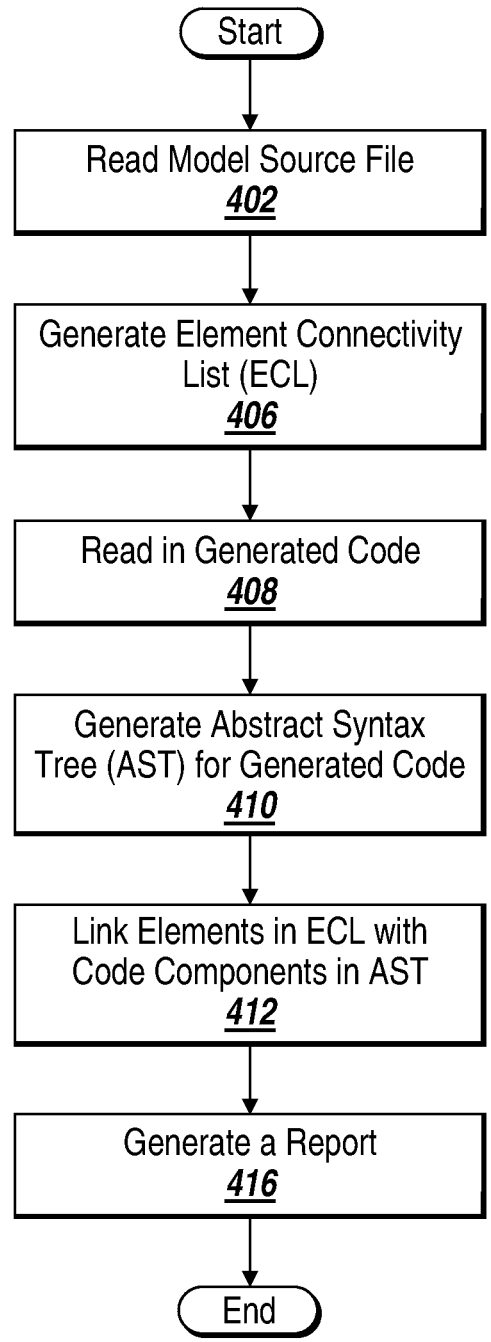
FIG. 4 is a flow diagram that illustrates verifying correctness of code generated from a model.

FIG. 4 depicts a flow diagram that illustrates exemplary processing techniques that can be used to verify code generated from a model. A code verification tool of an embodiment receives a representation of a model (step 402). For a graphical model, the representation may be a textual representation, graphical representation and/or an internal representation. The textual representation of the graphical model may be in the format, for example, of a .mdl file of Simulink® modeling software.

The code verification tool processes the model to create an element connectivity list (ECL) (step 406). The ECL is an internal representation of the information from the original model. Such information may include information about each element from the model, information about connectivity of the elements in the model, information internal to the elements in the model, etc. Information internal to the elements in the model may include element names, element types, parameters that are required by the elements, parameter types, size, data types, vector sizes, and types of the input and output, etc. In case of a block diagram model, for example, the ECL may include a list of all of the non-virtual blocks contained within the model. A virtual block is a block that does not provide any arithmetic or logical actions and do not have any functionality beyond providing connectivity, grouping, containers, or additional information for the blocks contained within them.

In an embodiment, some of the information for the ECL may be derived from a compiled version of the model. A compiled model may be a model for which its attributes have been determined, so that an executable representation may be derived. Determining model attributes may involve inferring sample times, data types, signal dimensions, etc., for example, by propagation in the model. That is, the code verification tool may compile the model file or may get the information from the compiled version prepared by a model compiler. The code verification tool may extract from the compiled model information about data types and signal dimensions. In an alternative embodiment, all information about the model that is used by the code verification tool may be received from the model file directly. Generation of the ECL is discussed in further detail in connection with FIGS. 5 and 6 below.

Before, during, or after generating the ECL, the code verification tool also reads in the generated code that has been generated from the model (step 408). The generated code may have been generated in the same modeling environment in which the code verification tool operates. Alternatively, it may have been generated outside of the modeling environment. In yet another embodiment, code generation may be initiated by a user in a sequence with code verification, and the generated code may be provided to the code verification tool upon completion of the code generation or it may be made available incrementally. The generated code may contain artifacts or markers inserted in portions of the generated code that do not relate to execution by the code generation tool 150. The artifacts or markers may include links back to the original model or indication of where different code statements are derived from within the model.

An abstract syntax tree (AST) may be created from the generated code (step 410). Alternatively, the code may be provided to the verification tool already processed into an AST. The AST is a tree representation of the syntax of the generated code, which relates to its functionality. Each component of the AST denotes a construct occurring in the generated code. Some constructs that appear in the generated code may not be represented in the AST. For instance, the AST may exclude some grouping parenthesis of the source code, and in the AST the grouping of the operands may be implicit in the tree structure. The AST may be built by a parser part of the verification tool or an external parser tool. Additional semantic analysis information may be added to the AST during or after its creation. For example, the AST used by the verification tool may include a file location for the generated code and a list of temporary variables declared within the generated code source file.

In order to verify the code, the code verification tool finds correspondences between entities in the ECL with nodes in the AST (step 412). There may be a one-to-many correspondence between an entity in the ECL and components in the AST, although the correspondence may also be one-to-one. Finding components in the AST that correspond to an entity in the ECL is described in further detail in conjunction with FIG. 8 below.

In an embodiment, for every entity in the ECL, there must be corresponding components in the AST, or, for example, information about transformations that may have resulted in the corresponding model element being removed by an optimization during the code generation. If a model element is found that does not have the proper corresponding component(s) in the AST or that matches the transformation, for example, for which there is no reason to expect it being removed by an optimization, that lack of the correspondence may be considered to be a verification failure. The code verifier locates and reports at least one such verification failure in a report (step 416).

Likewise, the AST may be traversed to find any components that have not been associated with a corresponding entity in the ECL (step 416). The traversal may be a top-down traversal or may employ any kind of tree search or traversal techniques known to one of skill in the art. The components in the AST that do not have corresponding entities in the ECL or that are not traced to a particular model or model element setting may be considered to represent functionality that is not present in the original model, and may thus also represent verification failures.

In an embodiment, the verification tool 160 may keep track of different types of verification failures and may generate a report (step 416). The report may include indication of the failures and locations where they occur. In an alternative embodiment, the failures may be marked on the generated code. The failures may also be marked on the model and/or links may be provided between the elements of the model and the corresponding elements in the code. In yet another alternative embodiment, the report may be a pass/fail report, representing whether the code overall has passed the verification.

Users may also be apprised of results of the code verification in many different ways. For example, the code verification tool may keep statistics about the code examined and about the particular patterns found therein. The report may include information about temporary variables used in the generated code and where they are used. The report may be in a format prepared according to user's settings or specifications. There may be an application programming interface (API) for specifying what information to include in the generated report.

Figure 5:
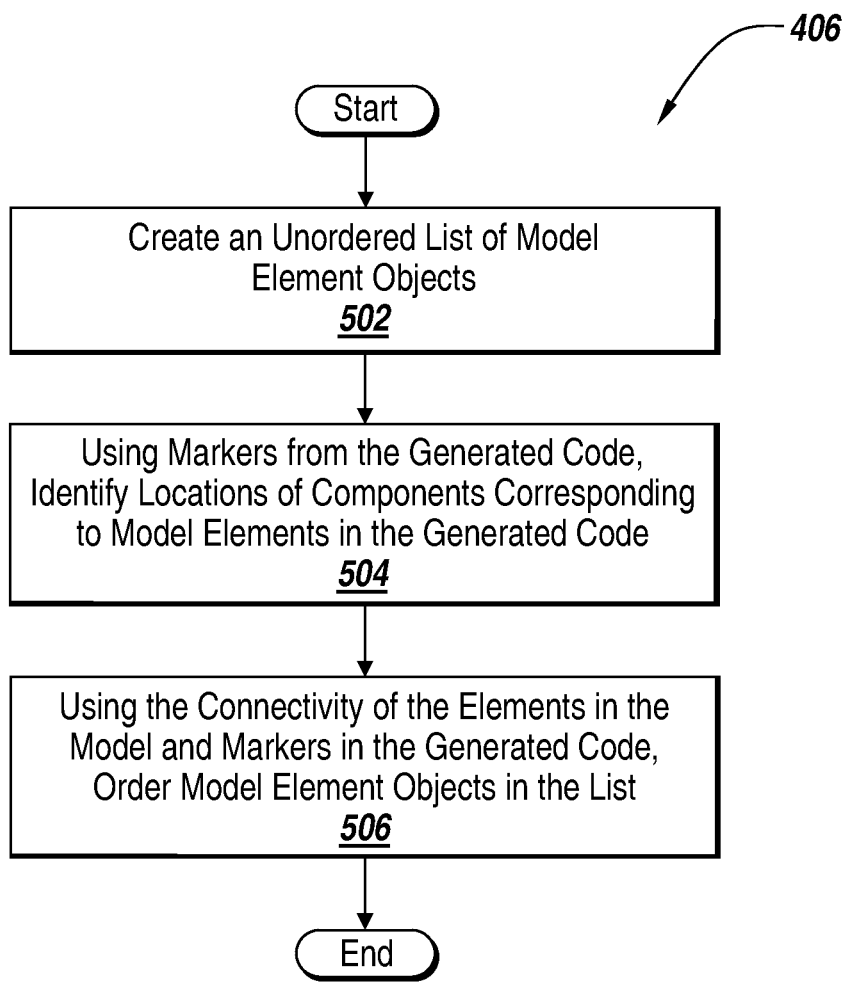
FIG. 5 is a flow diagram that illustrates creating an element connectivity list (ECL) from a model.

FIG. 5 is a flow diagram illustrating more particularly the process of generating an element connectivity list (ECL) from a model. The ECL is an ordered list of structures or objects representing model elements. An entity of the ECL may correspond to an element of the model or a portion of the element of the model. For example, in case of a block diagram model, there may be one or more entities corresponding to each block of the model. There may also be some blocks of the model that do not have corresponding entities in the ECL. For example, virtual blocks of the model need not have a corresponding entity in the ECL. A virtual block of a model may be a block that represents a grouping of one or more model elements without affecting the functionality of the model. If a model has other elements that do not affect the functionality of the model, such elements may also be not included in the ECL. An entity of the ECL may also represent some functionality of the model not embodied in a model element.

The ECL may be ordered based, in part, on the connectivity of the model and, in part, based on the arrangement of the generated code. For example, portions of the model that are independent from each other from the standpoint of control and/or data flow of execution may be arranged in multiple different ways in the generated code, while still preserving the functionality of the model. As such, there may be multiple different orderings of the entities in the ECL that also correctly represent the model functionality.

An unordered list or vector of entities is created first (502). Creating the unordered list is described in further detail in connection with FIG. 6, below. An unordered list of entities may be represented using various data structures, such as, for example, a linked list, a vector, an array, a dictionary, a set, a collection of objects, a heap, etc.

The generated code is then scanned to locate one or more markers that identify locations of code components corresponding to model elements in the generated code (504). Such markers may be contained, for example, in comment sections of the code, so that they are not processed by a compiler or an execution environment when the generated code is compiled or executed. The markers may be in any format appropriate as determined by one of skill in the art. In an embodiment, the markers may mark both the beginning and end of the section supposedly containing code corresponding to one or more elements of the model. It should be noted that a section indicated by a marker may contain code corresponding to multiple model elements. Furthermore, the code need not contain the statements appropriately corresponding to the model element indicated—the code verification tool 150 may identify this case. Therefore, the markers in the code may be consulted in order to aid the verification process and not as means of verifying that the code within the marked section contains what the marker specifies it does. In an alternative embodiment, the AST may include information related to the markers and the code components may be located by searching in the AST.

There may be some sections of the generated code that are not marked by any markers. Furthermore, in some cases the markers may be incorrect in that they incorrectly identify a section of code as corresponding to a particular model element. Even in these cases, the verification may still proceed, because the code verification tool 160 checks that the code reproduces the model functionality, not that it is marked correctly. The code verification tool 160 identifies correspondences between model elements and code components. In an embodiment, the code verification tool 160 may generate a report indicating these correspondences with more precision than the code markers inserted by the code generation tool 150. The unordered list of entities may be ordered using the connectivity of the elements in the model and markers in the generated code. (506). Ordering the unordered list of entities is described in further detail in connection with FIG. 7 below.

Figure 6:
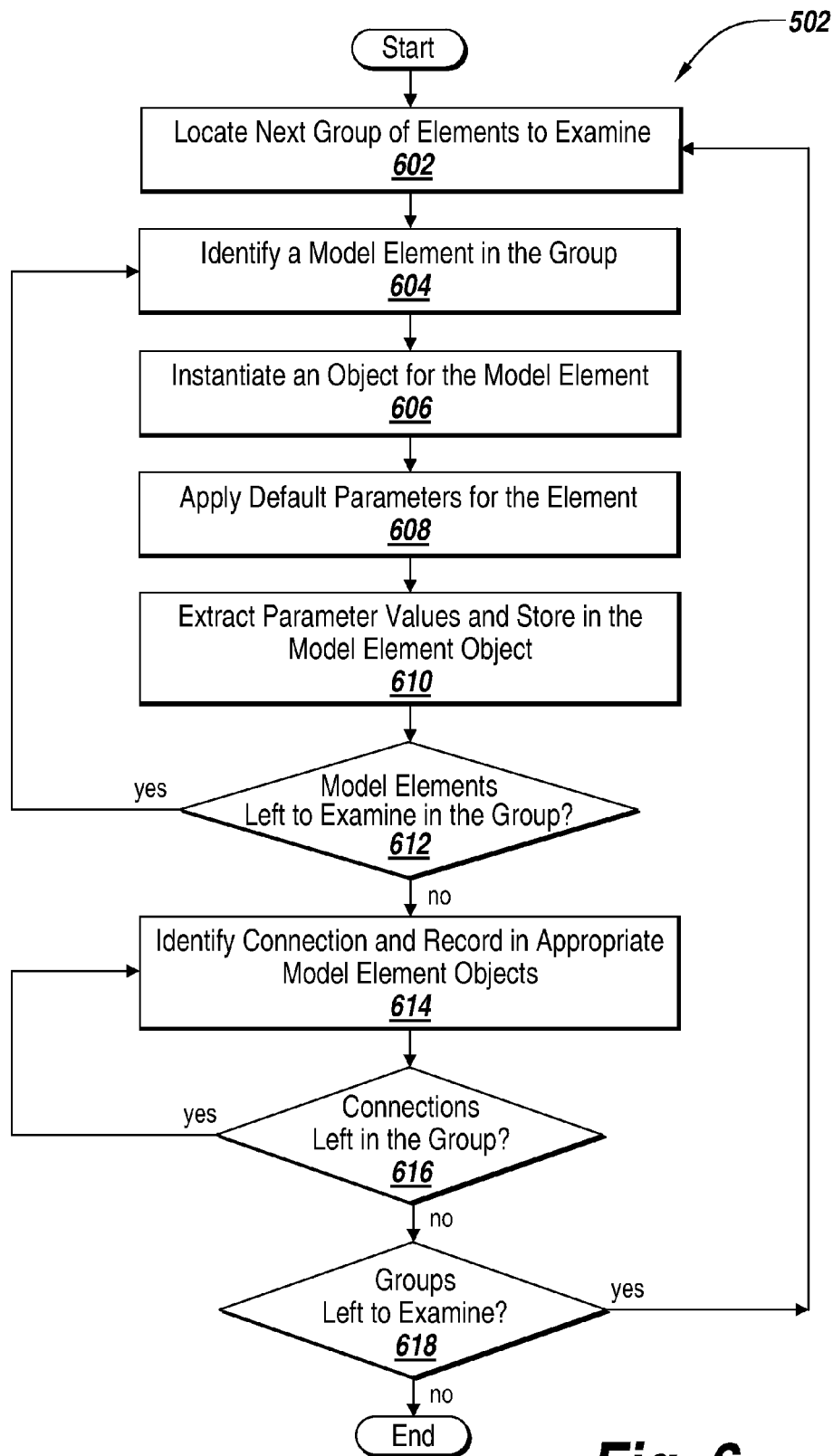
FIG. 6 is a flow diagram that illustrates creating an unordered list of entities for an element connectivity list.

FIG. 6 is a flow diagram illustrating generating an unordered list of entities. In an embodiment, a model is stored in an .mdl file created by the Simulink® modeling environment. Such a file may contain information about model elements grouped in groups of one or more elements. The grouping may first contain a list of the elements and then a description of connections between the elements. In an embodiment, a grouping of model elements may be considered a model element.

The .mdl file may be scanned to locate a group of model elements to examine (602). For each model element in a group (604), an object may be instantiated to hold information about that model element (606). An object may be of a class specifically designed to hold information about a model element. Such information may include information about the functionality of the element, its settings, its input and output parameters, default options, etc. An object may also be any other data structure employed to store information about one or more model elements. An object stored in an element connectivity list or a list that is to become an element connectivity list, may be referred to as an entity of the ECL.

In an embodiment, default model element parameters are applied and recorded for the model element (608). The actual model element parameter values may then be extracted and stored in the corresponding entity (610). Applying default model element parameters may be useful in case the actual model element parameters do not specify all of the possible parameters, leaving the other ones to be set to defaults.

If there are model elements left to examine in the group (612), the processing moves on to create objects for those model elements (604), otherwise connections between model elements are examined one by one. Each identified connection is recorded in the appropriate entities. A single connection may need to be recorded in more than one object. In particular, it may be noted in the source object, which is then indicated as the source for the destination object, as well as in the destination object, which is then indicated as a destination for the source object. Other information about the connection, such as the number and parameters it carries, etc., may be recorded as well.

A connection may have properties such as an interface (e.g., service interface) specified. These properties may cause additional entities in the ECL to be created to capture the functionality. While there are connections left to examine (614), they are processed one by one, after which the processing moves on to the next group, if any (618). In such a way, the entire model file is processed to extract information about model elements and to create an unordered list of entities.

It should be noted that the textual representation of the model need not be as described above. In particular, the model elements need not be grouped into distinct groups. So long as the model representation contains information about the model elements and connections between them, it may be appropriately processed into a list of entities, as implemented by one of skill in the art.

Figure 7:
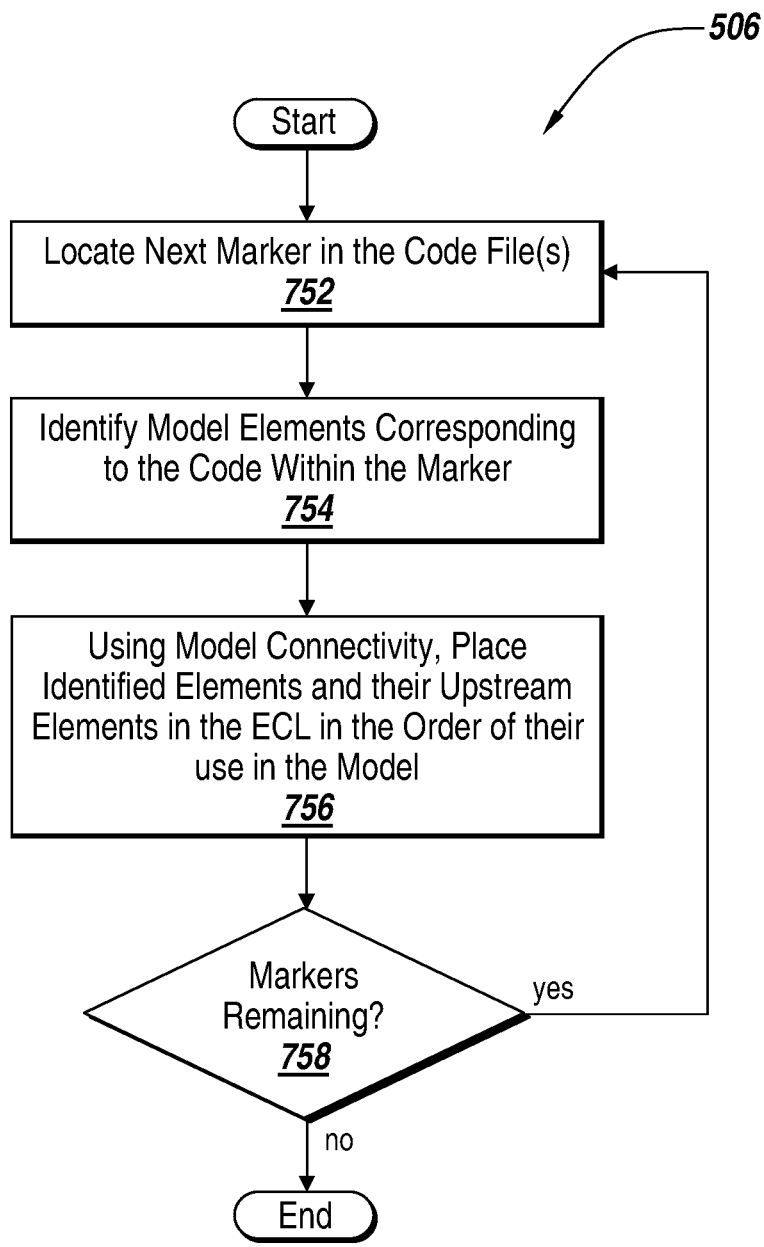
FIG. 7 is a flow diagram that illustrates ordering entities in an ECL.

FIG. 7 is a flow diagram illustrating in further detail ordering the unordered entities. As discussed above, the ECL entities are ordered using information from the markers in the generated code. When a marker is located (752), a model element corresponding to the code within the marker is identified (754). The code marker may be in a predetermined format, from which it may be possible to extract the model element identifier. Using that model element as a starting point, the model elements upstream from it may be used to order the ECL entities based on the model connectivity structure (756) of the model elements. That is, entities corresponding to those model elements may be ordered based on the connectivity of the model elements. In an embodiment, connections recorded in the entities may be links from one element to another, and may be followed to locate elements upstream from a particular model element. In such a way, in some models some or all of the model structure may be discovered even from a single model element, so long as it is located sufficiently far downstream.

In other models, it may be necessary to scan for additional markers (758) to locate additional model elements and to order those model elements upstream from them. Thus, if there are two or more sections of the model that are not dependent on each other in terms of an execution pattern— e.g. an order of execution—they may be ordered in the ECL based on the ordering in the generated code. However, if the model imposes an ordering based on the execution patterns, such order may be preserved in the resulting ECL.

In an alternative embodiment, a structure different from the ECL may be used to hold an internal representation of the model for code verification, so long as it is capable of being traversed in order to match model elements with their corresponding code components.

Figure 8:
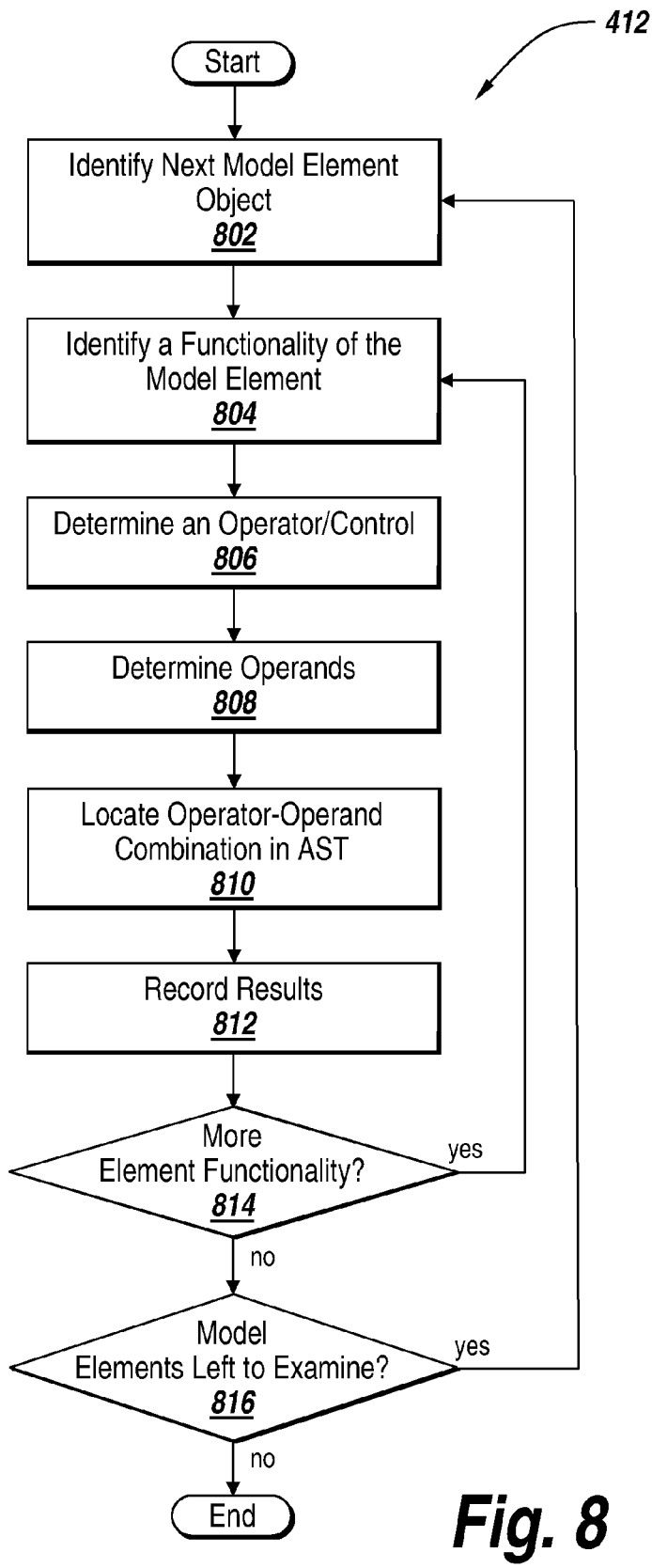
FIG. 8 is a flow diagram that illustrates determining appropriate code components for a model element.

FIG. 8 is a flow diagram illustrating matching entities and their corresponding code components in the generated code. The processing proceeds from one entity (model element object) to another within the ordered list (802) identifying for each entity one or more code functionalities of a model element that corresponds to that entity (804).

Model element functionality may be generally thought of as something requiring code functionality. Code functionality may be represented by one or more statements. Such statement may be an operator or a control. For example, an adder model element may have, among other functionalities, the functionality of adding two or more inputs. However, even though on the face of the model that may be all that the adder does, its functionality may not be limited only to the addition. In some cases, it may be necessary, for example, to modify parameters of input and/or output in order to make sure that they are of the correct type as specified. Modifying model parameters may be performed by casting them and/or setting appropriate overflows and other information relating to the parameter type.

Thus, the extent of the entity functionality may be determined not only by what model element it corresponds to, but also by what inputs and outputs are for that model element. It may also be affected by other model and code generation parameters. Whether any casting or any additional operations are required in the code to represent the functionality of the model element may be determined using parsers and/or objects designed for each type of a model element. In addition, one or more steering tables may be used to determine what additional operations, if any, are needed in the code to represent the model element functionality. Steering tables used for determining model element functionalities are discussed in further detail in connection with FIG. 9 below.

For each functionality of a model element, an operator or a control statement is determined (806). An operator may act upon operands. A control may be a statement directing control flow of the code, such as, for example, loop commands, case commands, IF/ELSE commands, etc.

Depending on the operator or control, there may be one or more operands that are needed for that operator (808). Those operands are determined based, in part, on the operator and based on what has already been determined for other entities. For example, an operand for a plus operator may be an expression or a variable. Values of that expression and/or variable may have been predetermined in conjunction with a previously verified model element. Therefore, they can be retrieved from storage associated with an entity corresponding to that model element. As such, the ordering of the entities in the ECL may be employed for traversal in order to match model elements with corresponding components in the code.

Once the operator-operand combinations have been determined, they are located in the generated code (810). As discussed above, the generated code may be represented using an AST. However, alternative representations may be possible, so long as they permit searching and allow for locating of operator-operand combinations. If the AST representation is used, in an embodiment there may be search functions employed to locate the operator-operand combinations, as implemented by one of skill in the art.

The results of searching the AST are recorded (812) to note whether the corresponding code has been found and where. Additional information from the code components may be recorded in the corresponding entities. Such information may be, for example, expressions and/or values of the output of the operands, temporary variables involved, etc. The information may be recorded in the entities, and/or directly in a report or other memory structures holding information for the report.

Once the match information has been recorded, if there is more model element functionality remaining to be examined (814), the matching process proceeds to the additional functionality. Otherwise, the matching process moves on to the next model element to examine (816), until all model elements have been examined and matches with to code components have been attempted to be found.

FIG. 9 includes schematic illustrations of two steering tables that may be employed in determining code that should correspond to an element. As discussed above, the steering tables are not the only ways to make this determination, and there may be a number of steering tables, not just the ones illustrated herein. Shown in FIG. 9 is a table 902 that serves to determine a lookup index into a table 904.

The table 902 is used based on the input and output data types of the model element (912 and 914), rounding method employed (916), saturation on integer overflow setting (918), etc. In each of the columns, there may be values representing a particular selection for the variable of that column. For example, in the input data types column 912, there may be values representing double 920a, float 920b, int32 920c, int16 920d, int8 920e, unsigned32 920f, unsigned16 920g, unsigned8 920h, Boolean 920i, etc. It should be noted that the values are shown only to illustrate the kind of input data type values that may be possible. The values need not be arranged in this precise order. Similarly, present in the output data types column 914, there may be values indicating data types 920a-i. In an alternative embodiment, additional data types may be considered.

In the rounding method column 916, there may be values indicating ceiling 922a, simplest 922b, floor 922c, zero 922d, or nearest 922f rounding methods. In the saturation on integer overflow column 918, there may be values indicating whether the saturation is required or not. In an alternative embodiment, there may be additional columns and/or values based on which a functionality is looked up.

The steering table 902 may provide a key into steering table 904 that lists control values 930, specifying which transformations, if any, are needed in order to make sure that an operation takes in appropriate input and outputs appropriate output. Additional steering tables may be used to determine other details about the generated code that need to be taken into account when matching the model elements with the code components.

Figure 10:
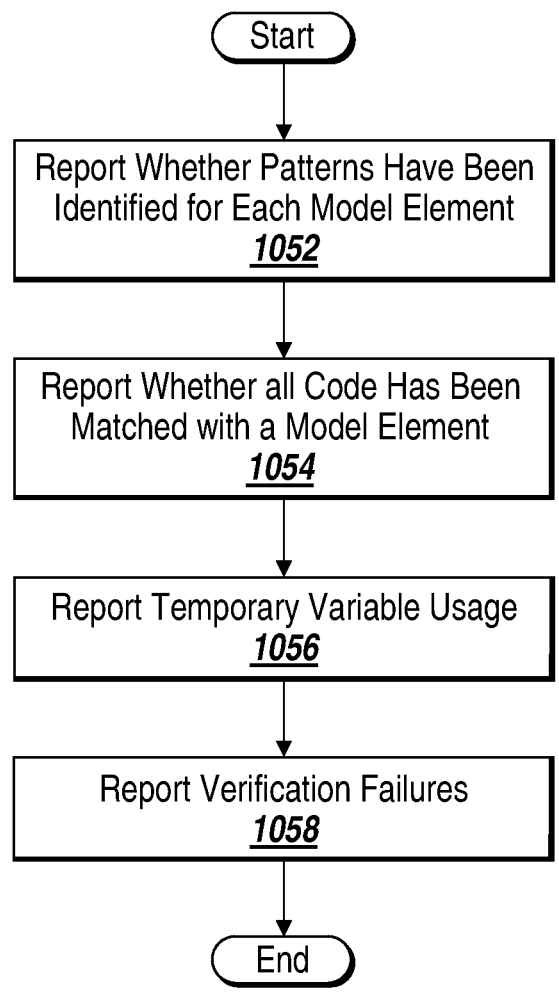
FIG. 10 is a flow diagram that illustrates generating a report of code verification results.

FIG. 10 is a flow diagram illustrating generating a report for the code verification activities. The report may be compiled as the code verification proceeds, with information added as it is generated, or it may be created afterwards, using the information recorded in different places.

A report may include a section reporting whether code patterns have been identified for each model element (1052), as well as an indication of whether all code components have been matched with an element (1054). Any model elements and/or code components that have not been matched may be reported specifically, so that the user may be apprised of specifics of the verification failures.

The report may also include a description and/or accounting of temporary variables usage in the generated code (1056). The temporary variables may be listed with indication as to where they are used in the code.

The report may also go into additional details, as determined by one of skill in the art. For example, the code verification process may check whether the generated code provides an expected interface to the model, and the results of this check may be reported to the user. Verifying the correct interface may also involve verifying that a reusable code interface is correctly contained in the generated code and the corresponding AST. If the model is indicated to contain non-reusable code, then the verification tool 150 may verify that the non-reusable code interface is contained in the generated code. In addition, the verification tool may check that structures storing values during time steps (e.g., DWORK structures) are properly contained in the interface, as well as that the model element I/O structures are properly contained in the interface to the generated code. All of these interface details may be included in the report.

There may be also additional verifications that are performed by the code verification tool and the results of which are included in the report. For example, verification tool 150 may determine that all of the expected entry points into the generated code have been correctly generated by the code generation. A model may be processed in stages, such as evaluating its output, updating its state, computing its derivatives, etc. These stages may constitute entry points. Some models may also have a single step stage.

The model options settings, such as, for example, code reuse, exported functions, combining model output and model update calls, etc., may partially determine what code entry points are expected. In addition, some model elements such as, for example, a rate transition element may require specific entry points into the generated code, for example, to evaluate functionality at different rates that may be in different paths. In addition the verification tool 150 may determine whether there are unexpected entry points in the generated code. Such entry points may be determined based on scanning the AST for the entry points and determining whether they correspond to the expected entry points. Furthermore, the report generation tool may determine whether all model element names have been generated correctly. In some embodiments these names may be "mangled" in some cases, if the length of the name is restricted and there are unintentional matches, and part of the verification activities may be determining that the mangled names have been generated correctly. The report may list these mangled names and/or indicate whether they have been generated correctly.

Furthermore, as part of the verification and/or reporting activities, the code verification tool 150 may inspect the generated code to verify that in-line and non-in-line model subsystems have been generated correctly. For in-line model subsystems, the corresponding code may need to be contained within the same file as the code for the rest of the model. For the non-in-line model subsystems, the generated code may need to be contained in a separate file. In addition, for the non-in-line model subsystems, the generated code may need to have its own interface accessible from outside the model subsystem and it may be verified that this interface is called from within the generated code for the rest of the model. It may also be verified that the interface is external to the model.

The results of these and other verification activities may be reported to the user. The report may be provided as a document or a set of documents in whichever format determined appropriate by one of skill in the art. In an alternative embodiment, there may be a user interface for viewing the code verification report and browsing corresponding code and/or model sections where appropriate. In yet another embodiment, the results of code verification activities may be reported visually in conjunction with the model. For example, the model elements for which no corresponding code components have been found, may be visually indicated as such to the user. In an alternative embodiment, the report may be incrementally generated and displayed to the user as it is being created.

Figure 11A:
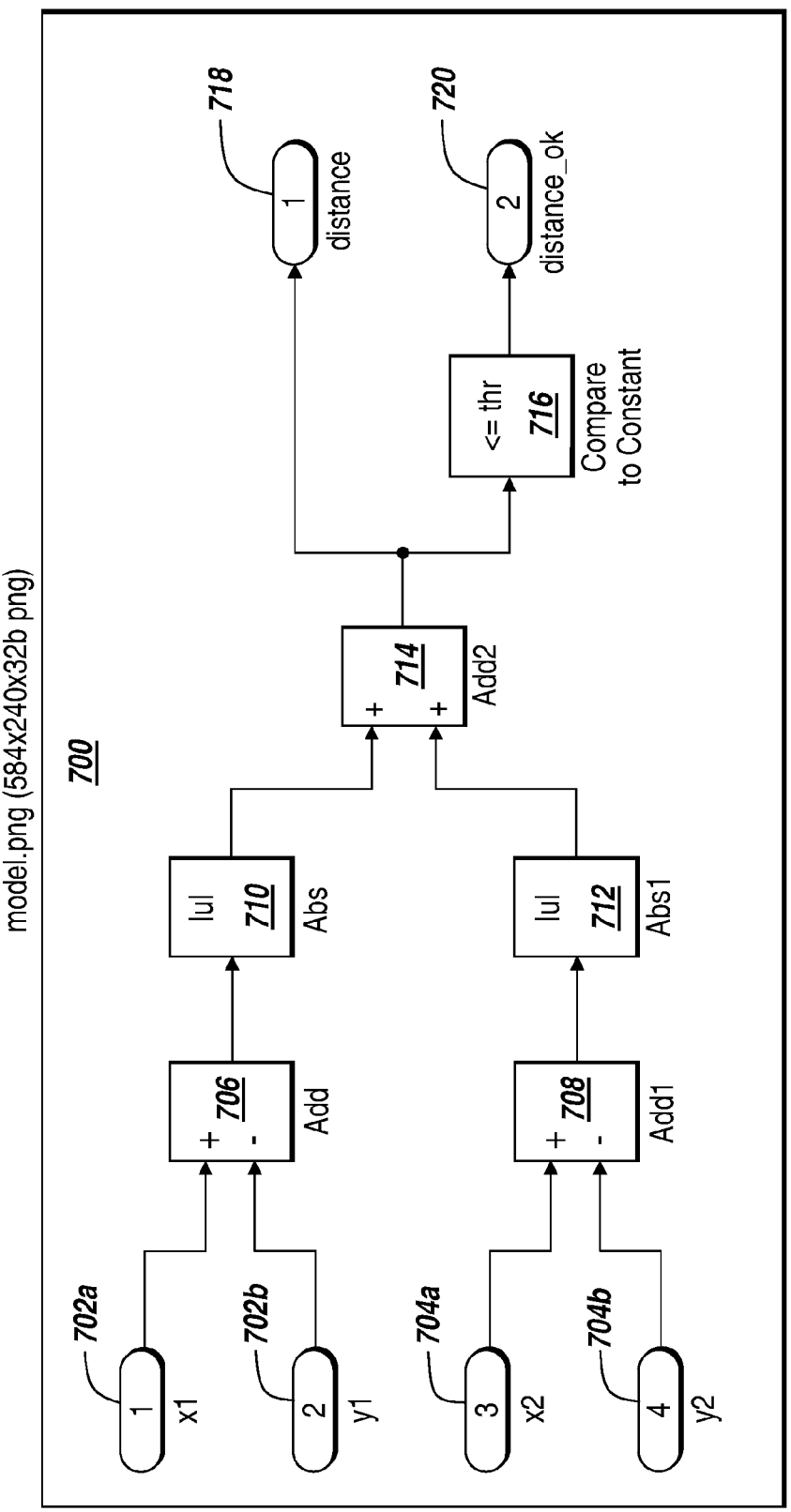

FIGS. 11A-D are an illustration of an exemplary model, corresponding generated code, a corresponding ECL and a corresponding AST. As shown in FIG. 11A, a model 700 has four inputs (702a-b and 704a-b), each pair of the inputs feeding into an adder (706 and 708), and then into a model element that determines an absolute value of its input (710 and 712). The results of the previous computations are added together in the adder 714 and are outputted (718), as well as compared to an absolute value (716). The result of the comparison is outputted as well (720). The external interface presented by this model includes four inputs (702*a-b* and 704*a-b*) and two outputs (718 and 720).

FIG. 11B illustrates an exemplary code segment generated for this model. Corresponding statements and commands are marked with corresponding numbers to the elements in the model. As can be observed, there is no statement corresponding to the absolute value block 710. This lack of correspondence may be explained by an optimization during the code generation. In this particular model, the output of the adder block 706 is an unsigned integer, which is guaranteed to be positive, so no additional operations are needed to find its absolute value. The code verification tool 160 may know of such optimizations and not consider the lack of the corresponding statement to be an error. Code shown in FIG. 11B is not the only possible code that could be verified for the model 700. As will be understood by one of skill in the art, there may be many different code variations that still properly reflect the functionality of the original model. As such, the code verification tool 150, may account for those variations in order to properly verify the generated code.

Figure 11C:
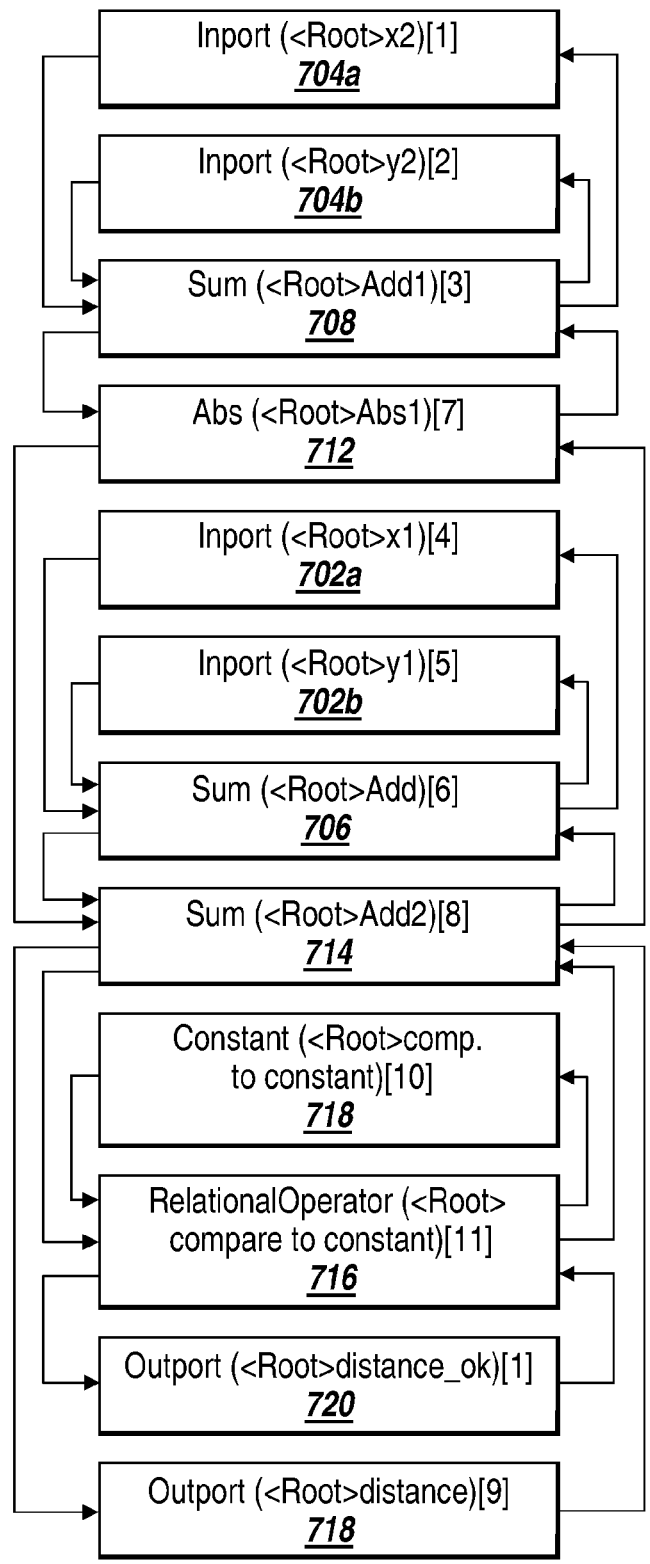
Figure 11D:
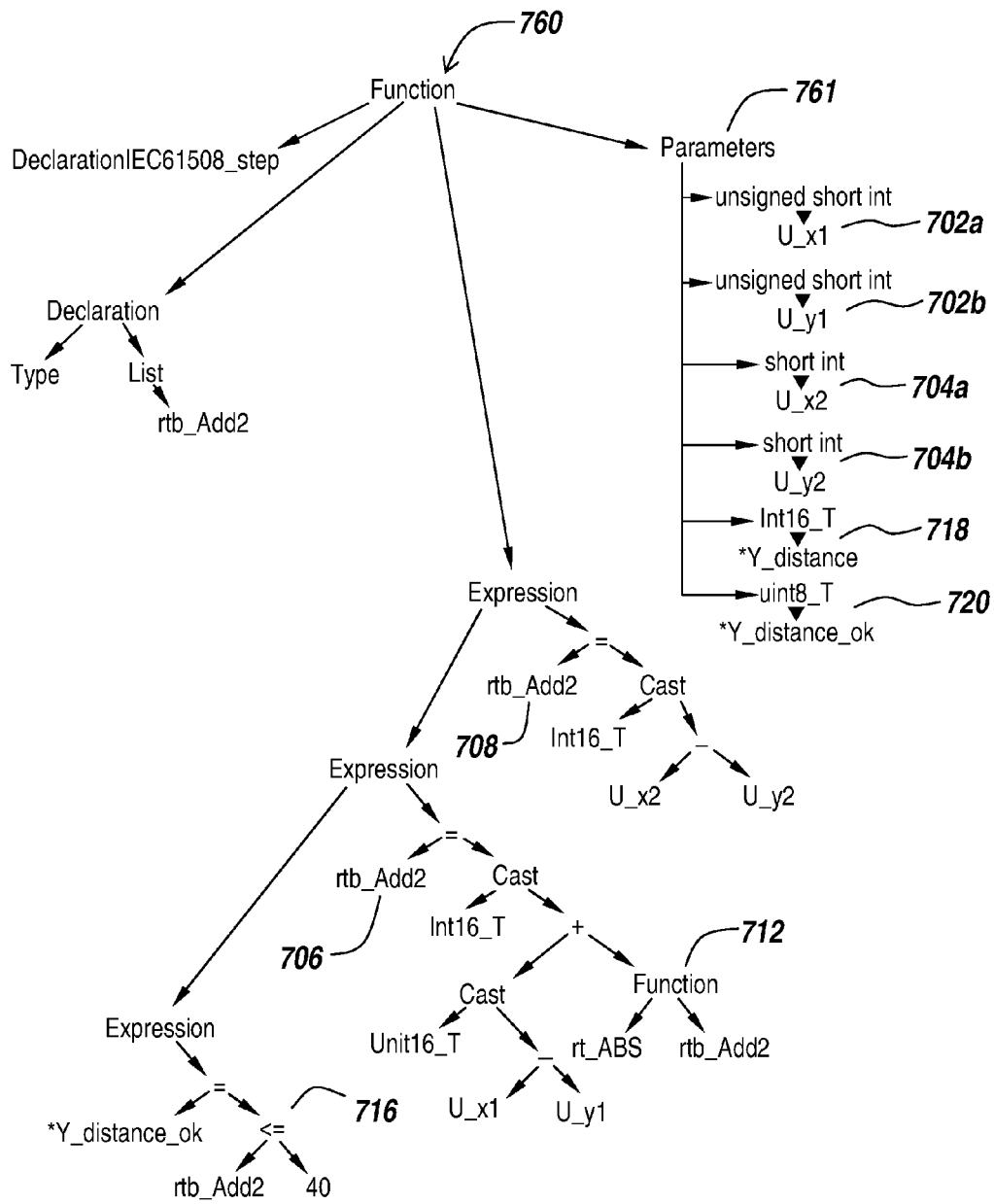

FIGS. 11C and 11D illustrate the corresponding ECL and AST for the model 700. They too do not contain nodes for element 710 because of the optimization information. Other corresponding elements are marked with the same corresponding numbers. The ECL of FIG. 11C is illustrated using the following convention for the arrows: the arrows to the left of the list indicate relationships from a source element to a destination element, while the arrows to the right of the list indicate relationships from the destination block to the source block. As discussed above, these connections may be useful in navigating the entities list to order it, as well as to verify the generated code.

FIG. 11D illustrates the AST for the model 700. In the AST, a node may represent an operator or a control, and its children nodes may represent the operands. The interface to the model 700 is included in the AST in the node parameters 761. As shown, the interface includes input variables 702*a-b* and 704*a-b*, as well as output variables 718 and 720, just as it is in the interface to the model itself. There are no unexpected entry points into this AST.

Figure 12:
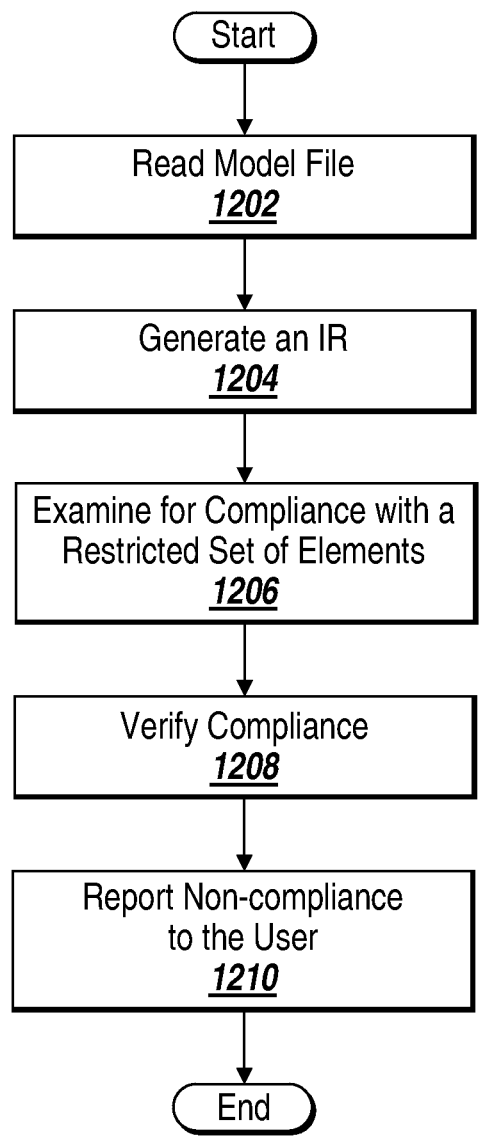
FIG. 12 is a flow diagram illustrating inspecting a model for compliance with a restricted subset of elements and configurations of elements supported by the code verification tool.

The code verification tool may support all of the features and elements allowed in a model in a particular modeling environment, or it may only support a restricted subset of the model elements. FIG. 12 is an illustration of a process of checking whether the model contains any elements that are not supported by the code verification tool 150. When the model source file is received by the code verification tool (step 1202), an intermediate representation is generated (step 1204), and is examined for compliance with a restricted subset of elements (step 1206). The compliance may be verified based on all elements belonging to the restricted subset of elements and/or based on additional factors (step 1208).

If there are elements of the model that fall outside of the supported set, the code generation tool may report non-compliance to the user (1210).

Figure 13:
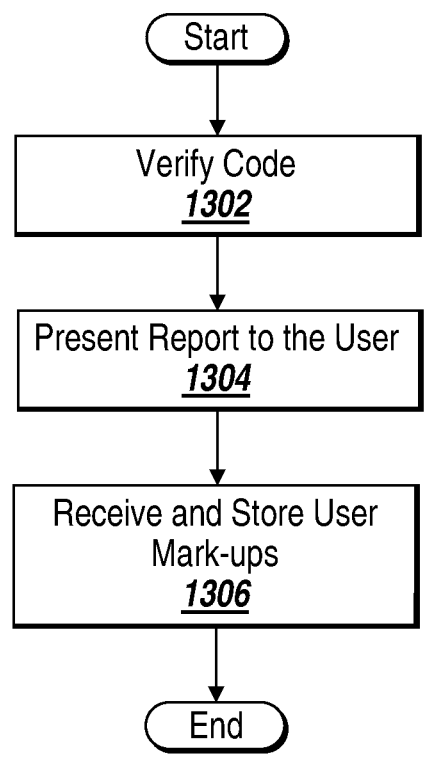
FIG. 13 is a flow diagram illustrating providing an interface for browsing and/or marking sections of the generated code and the corresponding sections of the model.

In an embodiment, the verification results may be visually marked up for the user on the model and/or code. In addition, the user may be able to mark up the model and/or code after receiving the verification report. FIG. 13 is a flow chart illustrating the process of verifying code and marking it up in accordance with the verification results. After the code is verified (step 1302), a report may be presented to the user (1304) or the user may be shown marked-up code. The user may then choose to manually verify portions of the code, whether those that have been verified by the code verification tool or not, and to mark-up the code in accordance with the manual verification. User-generated mark-ups may be stored and/or reflected on the model or the code.

Figure 14A:
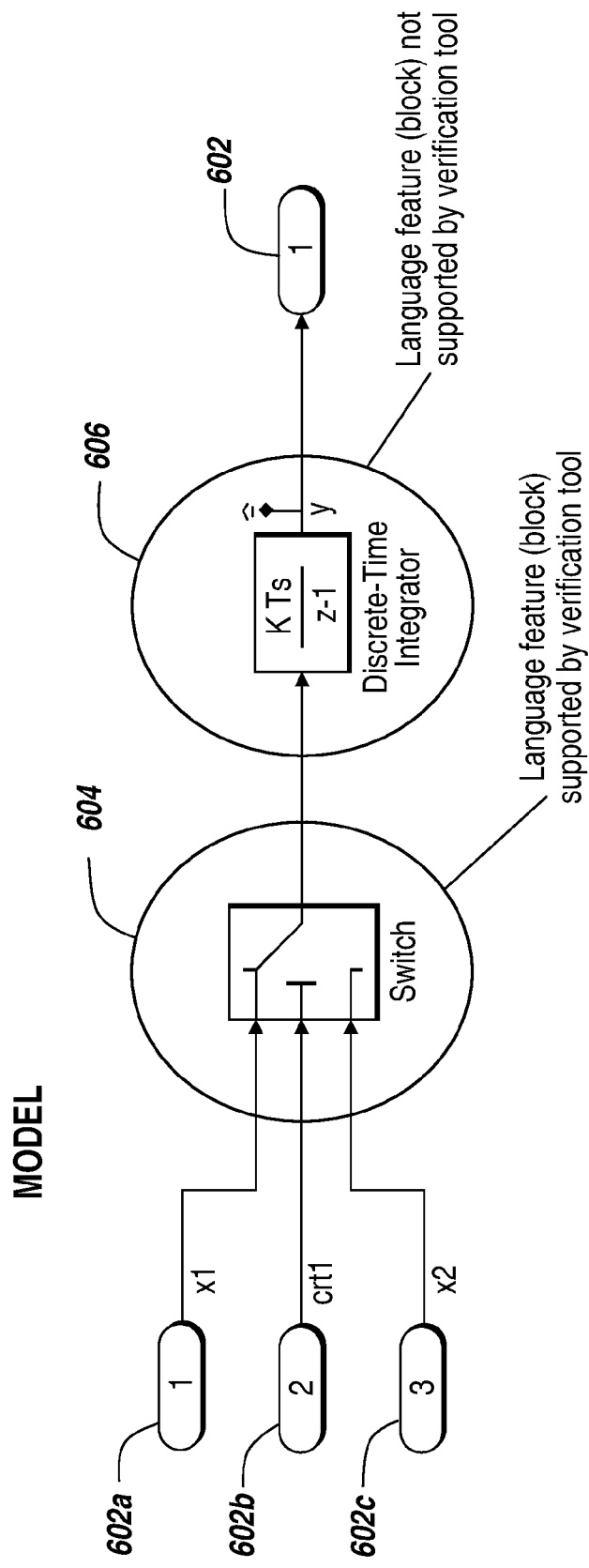

FIG. 14A-B is another example of a model and corresponding code, marked-up in accordance with an embodiment. Model code that has been derived from supported language features—that is, features supported by the code verification tool—is marked with a checked checkbox (1002*a-c*), and code that has been derived from unsupported features is marked with a question mark (1004*a-b*). A user is then able to inspect the code and/or make appropriate mark-ups.

FIG. 15 is another example of code marked up in accordance with an embodiment. In this example, verified code 1102 is marked in green and unverified code 1104 is marked in grey. Sections of the code containing verified failures may be marked in red (1106).

The present invention may be provided as one or more computer-readable programs embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus. In general, the computer-readable programs may be implemented in any programming language. Some examples of languages that can be used include Python, C, C++, C#, Java, Javascript etc. Further, the computer readable programs can be implemented in a hardware description language or any other language that allows prescribing computation such as, for example, Deoxyribonucleic acid (DNA). The software programs may be stored on or in one or more mediums as object code.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A non-transitory computer-readable medium storing instructions, the instructions comprising:
  one or more instructions that, when executed by a processor, cause the processor to:
    obtain a graphical model,
      the graphical model representing a dynamic system;
    generate, based on the graphical model, a semantic representation of the executable graphical model;
    generate textual code for the graphical model, the textual code being executable to simulate a behavior of the dynamic system;
generate a semantic representation of the textual code;
perform a verification of the textual code,
the one or more instructions to perform the verification of the textual code including:
one or more instructions that, when executed by the processor, cause the processor to:
determine whether the semantic representation of the graphical model includes a corresponding element for each element included in the semantic representation of the textual code, and
determine whether the semantic representation of the textual code includes a corresponding element for each element included in the semantic representation of the graphical model; and
output a result of the verification,
the result indicating whether the semantic representation of the graphical model includes a corresponding element for each element included in the semantic representation of the textual code, and whether the semantic representation of the textual code includes a corresponding element for each element included in the semantic representation of the graphical model.

2. The non-transitory computer-readable medium of claim 1, where the semantic representation of the executable graphical model is an element connectivity list.

3. The non-transitory computer-readable medium of claim 2, where the semantic representation of the textual code is an abstract syntax tree (AST), and
where the one or more instructions to determine whether the semantic representation of the graphical model includes a corresponding element for each element included in the semantic representation of the textual code includes:
one or more instructions that, when executed by the processor, cause the processor to determine whether there is a correspondence between entities included in the element connectivity list and nodes in the AST, and
where the one or more instructions to determine whether the semantic representation of the textual code includes a corresponding element for each element included in the semantic representation of the graphical model includes:
one or more instructions that, when executed by the processor, cause the processor to determine whether there is a correspondence between the nodes in the AST and the entities included in the element connectivity list.

4. The non-transitory computer-readable medium of claim 1, where the one or more instructions to determine whether the semantic representation of the graphical model includes a corresponding element for each element included in the semantic representation of the textual code includes:
one or more instructions that, when executed by the processor, cause the processor to:
determine whether at least one element of the semantic representation of the executable graphical model corresponds to a set of elements of the semantic representation of textual code.

5. The non-transitory computer-readable medium of claim 1, wherein the report comprises where the one or more instructions to output the result include:
one or more instructions that, when executed by the processor, cause the processor to generate a report that includes a link to a model element in the executable graphical model,
the model element corresponding to at least one element of the semantic representation of the executable graphical model for which the semantic representation of the textual code does not include a corresponding element, and output the report.

6. The non-transitory computer-readable medium of claim 5, where the instructions further comprise:
one or more instructions that, when executed by the processor, cause the processor to:
provide the graphical model for display; and
indicate graphically the model element in the graphical model.

7. The non-transitory computer-readable medium of claim 6, where the instructions further comprise:
one or more instructions that, when executed by the processor, cause the processor to:
cause the model element to be displayed in a color that is different from another color,
other model elements in the graphical model being displayed in the other color.

8. The non-transitory computer-readable medium of claim 1, where the instructions further comprise:
one or more instructions that, when executed by the processor, cause the processor to:
provide the graphical model for display,
the displayed graphical model visually indicating a first subset of model elements of the graphical model for which corresponding code has been identified in the textual code.

9. The non-transitory computer-readable medium of claim 8, where the first subset of model elements includes at least one of:
a block included in the graphical model,
a subsystem included in the graphical model,
a set of predefined blocks included in the graphical model,
an arbitrary region of connected blocks included in the graphical model, or
a set of blocks, included in the graphical model, with predetermined settings.

10. The non-transitory computer-readable medium of claim 8, where the instructions further comprise:
one or more instructions that, when executed by the processor, cause the processor to:
cause a second subset of model elements of the graphical model, for which corresponding code has not been identified in the textual code, to be visually distinguishable from the first subset of model elements.

11. The non-transitory computer-readable medium of claim 1, where the instructions further comprise:
one or more instructions that, when executed by the processor, cause the processor to:
provide the textual code for display; and
cause a first subset of code components, included in the textual code, for which corresponding model elements have not been identified in the graphical model, to be visually distinguishable from a second subset of code components.

12. The non-transitory computer-readable medium of claim 11, where the instructions further comprise:
one or more instructions that, when executed by the processor, cause the processor to:
cause a third subset of code components, included in the textual code, for which corresponding model elements have been identified in the executable graphical model, to be visually distinguishable from the first subset of code components.

13. The non-transitory computer-readable medium of claim 12, where at least one of the first set of code components or the second set of code components include at least one of:
a code file,
a function, or
an arbitrary code section.

14. A method comprising:
obtaining a graphical model representing a dynamic system,
obtaining the graphical model being performed by a device;
generating, based on the graphical model, a semantic representation of the graphical model,
generating the semantic representation of the graphical model being performed by the device;
generating textual code for the graphical model,
the textual code being executable to simulate a behavior of the dynamic system, and
generating the textual code being performed by the device;
generating a semantic representation of the textual code,
generating the semantic representation of the textual code being performed by the device;
performing a verification of the textual code,
the verification being performed by the device, and
performing the verification including:
determining whether the semantic representation of the graphical model includes a corresponding element for each element included in the semantic representation of the textual code, and
determining whether the semantic representation of the textual code includes a corresponding element for each element included in the semantic representation of the graphical model; and
outputting a result of the verification,
outputting the result being performed by the device, and
the result indicating whether the semantic representation of the graphical model includes a corresponding element for each element included in the semantic representation of the textual code, and whether the semantic representation of the textual code includes a corresponding element for each element included in the semantic representation of the graphical model.

15. The method of claim 14, where generating the semantic representation of the graphical model includes:
generating an element connectivity list.

16. The method of claim 14, where generating the semantic representation of the textual code includes:
generating an abstract syntax tree (AST).

17. The method of claim 14, further comprising:
providing the graphical model for display,
a first subset of model components, of the graphical model, for which corresponding code has been identified in the textual code, being visually distinguishable from a second subset of model components of the graphical model.

18. The method of claim 17, where the first subset of model components includes at least one of:
a block included in the graphical model,
a subsystem included in the graphical model,
a set of predefined blocks included in the graphical model,
an arbitrary region of connected blocks included in the graphical model, or
a set of blocks, included in the graphical model, with predetermined settings.

19. The method of claim 14, further comprising:
providing the graphical model for display,
a subset of model components, of the graphical model, for which corresponding code has not been identified in the textual code, being visually distinguishable from other model components of the graphical model.

20. A system comprising:
a memory storing:
a semantic representation of an executable graphical model representing a dynamic system; and
a semantic representation of textual code,
the textual code being generated from the executable graphical model; and
a processor to:
perform a verification of the textual code,
the processor, when performing the verification of the textual code, being to:
determine whether the semantic representation of the graphical model includes a corresponding element for each element included in the semantic representation of the textual code; and
output a result of the verification,
the result indicating whether the semantic representation of the graphical model includes a corresponding element for each element included in the semantic representation of the textual code, and whether the semantic representation of the textual code includes a corresponding element for each element included in the semantic representation of the graphical model.

* * * * *